(12) United States Patent
Bagley

(10) Patent No.: US 7,243,910 B2
(45) Date of Patent: Jul. 17, 2007

(54) CONE SYSTEM AND STRUCTURE THEREOF TO PRODUCE SUPER-OXYGENATED AND STRUCTURED WATER

(76) Inventor: David Bagley, 28 Fria Ct., Angel Fire, NM (US) 87710

( * ) Notice: Subject to any disclaimer, the term of this patent is extended or adjusted under 35 U.S.C. 154(b) by 0 days.

(21) Appl. No.: 11/144,023

(22) Filed: Jun. 3, 2005

(65) Prior Publication Data

US 2006/0273475 A1 Dec. 7, 2006

(51) Int. Cl.
*B01F 3/04* (2006.01)

(52) U.S. Cl. .................... 261/64.1; 261/79.2

(58) Field of Classification Search .......... 261/16, 261/21, 79.1, 79.2, 115, 119.1, 121.1, DIG. 39, 261/64.1
See application file for complete search history.

(56) References Cited

U.S. PATENT DOCUMENTS

| | | | | |
|---|---|---|---|---|
| 4,834,343 A * | 5/1989 | Boyes | .................... | 261/79.2 |
| 5,865,995 A * | 2/1999 | Nelson | .................... | 210/205 |
| 5,925,292 A * | 7/1999 | Ziesenis | .................... | 261/77 |
| 6,207,064 B1 * | 3/2001 | Gargas | .................... | 210/752 |
| 6,234,459 B1 * | 5/2001 | Rock | .................... | 261/79.2 |
| 6,464,210 B1 * | 10/2002 | Teran et al. | ............... | 261/79.2 |
| 6,562,240 B1 * | 5/2003 | Clark | .................... | 210/703 |
| 6,955,341 B2 * | 10/2005 | Liou | .................... | 261/64.1 |
| 6,969,052 B2 * | 11/2005 | Korzeniowski | ............. | 261/76 |
| 6,983,929 B2 * | 1/2006 | Shane | .................... | 261/79.2 |
| 2005/0109697 A1* | 5/2005 | Olivier | .................... | 210/610 |
| 2006/0065987 A1* | 3/2006 | Schletz | .................... | 261/76 |

* cited by examiner

*Primary Examiner*—Scott Bushey
(74) *Attorney, Agent, or Firm*—The Fleshner Group, PLLC

(57) ABSTRACT

A cone system to produce super-oxygenated and structured water is provided. The cone system includes a source of oxygen, and a plurality of cones in communication with the source of oxygen and configured to receive preconditioned water and spin the preconditioned water to combine it with oxygen received from the source. The system may be used with a system and method for producing and tuning super-oxygenated and structured water.

18 Claims, 28 Drawing Sheets

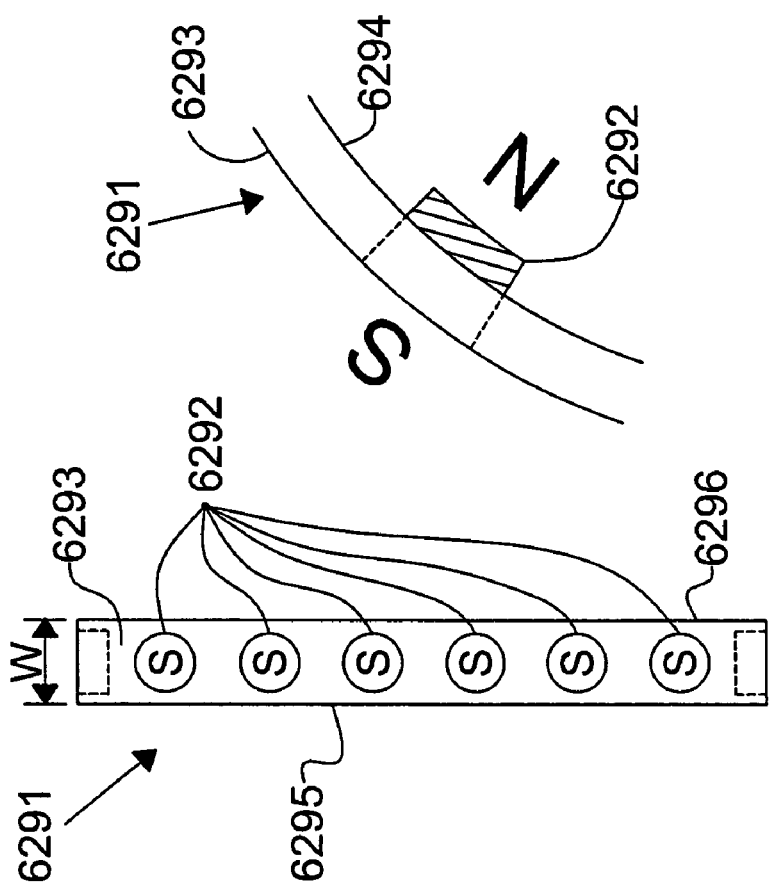
FIG. 5G
FIG. 5F
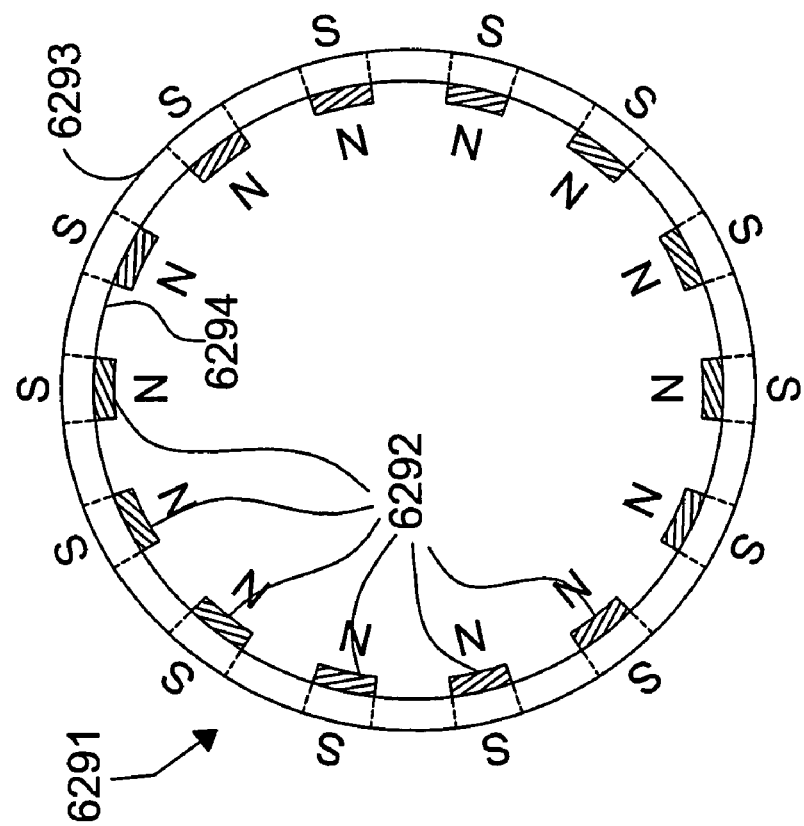
FIG. 5E

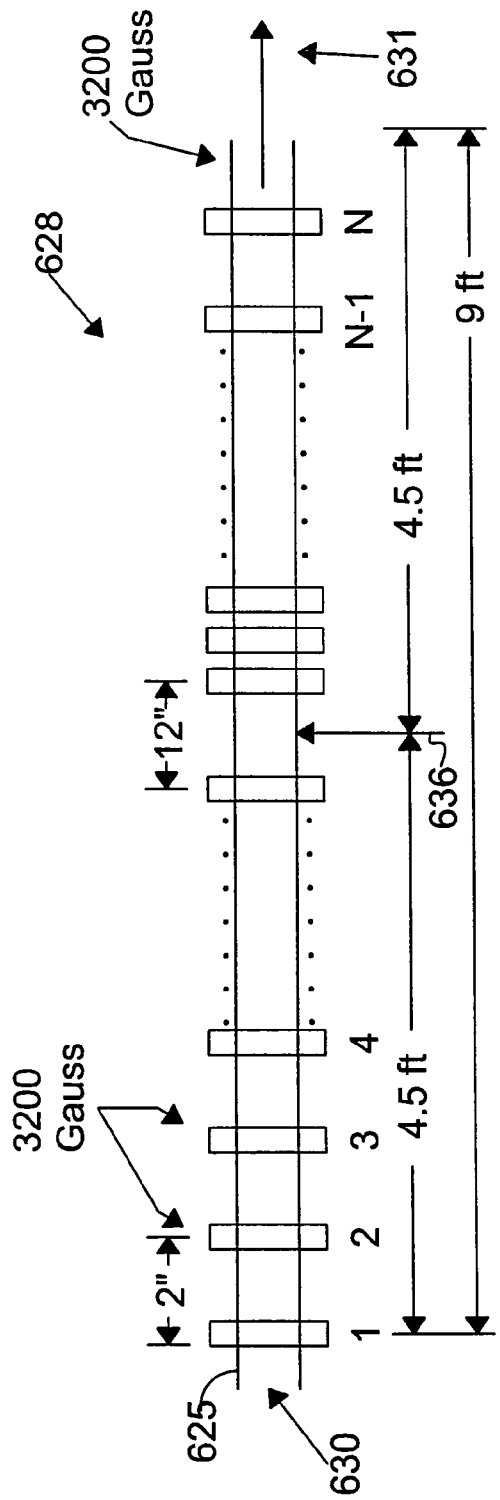
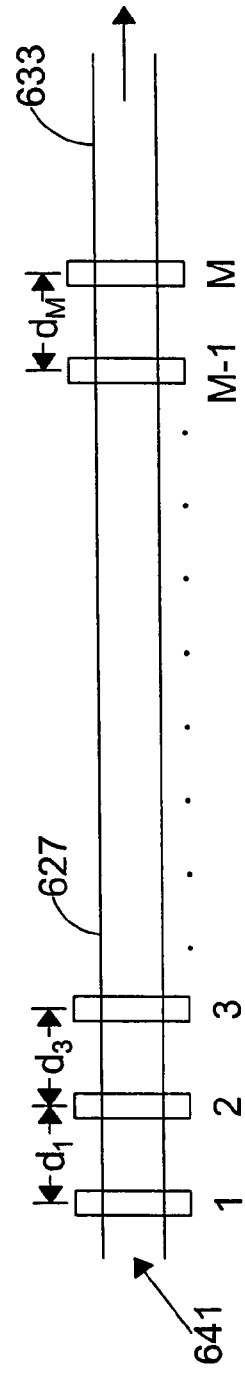
FIG. 6A
FIG. 6B

CONE SYSTEM AND STRUCTURE THEREOF TO PRODUCE SUPER-OXYGENATED AND STRUCTURED WATER

BACKGROUND OF THE INVENTION

1. Field of the Invention

The invention is directed to a cone system and structure thereof to produce super-oxygenated and structured water.

2. Background of the Related Art

Water supplies are becoming polluted at an alarming rate and the aquifers that haven't been contaminated are now under duress. Pristine aquifers are disappearing as demand for good, clean, drinkable water increases. Water has been taken for granted for the last seventy five years, and because so-called clean potable water has been so easily and readily available from our kitchen tap, the importance of water and water conservation has been lost to the masses. Several of our larger cities and many smaller ones cannot pass clean water tests. More and more chemicals are added to municipal water supplies to enable these water supplies to pass 'safe' levels for consumption. Adequate chemical levels are consistently being increased to accommodate the higher chemical levels found in municipal water supplies. Mining, farming, and industrial wastes have formed an intricate overlap of contaminants that in most cases cannot be cleaned out of water supplies sufficiently enough to make the water safe to bathe in, much less drink.

Water treatment facilities inadvertently add pollutants to their water at the same time it is being 'purified'. Chlorine reacts with organic substances in the water to form trihalomethanes (THM's), a known group of carcinogens. In 1975, an EPA survey of eighty cities' water supplies was the first official alarm that there was a definite and serious problem. One particular THM, chloroform, was found in all the samples tested, with three other THM's found in most of the samples tested. In 1980, a study showed that cancer rates were extremely higher in cities that chlorinated their municipal water supplies. This was again attributed to the influence of 'THM's. People who drank chlorinated water were found to have 53% greater chance of contracting colon cancer and up to 93% greater chance of contracting rectal cancer. These figures are according to a report by the Presidents Council on Environmental Quality. Also noted as a common additive to water and in the same report, fluoride was reported to cause bone and kidney damage when found in quantities that were considered to be much more than adequate.

This is just the tip of the iceberg regarding clean water. In addition, a variety of contaminants can enter municipal water supplies as the water travels from the treatment plant to the kitchen tap. Many water supply systems are well over one hundred years old and are full of holes. As water mains deteriorate, asbestos, lead, and many other toxic metals and substances are released into the water. Inhibitors added to the water to slow down deterioration of the pipes are sometimes themselves toxic. Estimates indicate that there are more than 400,000 miles of asbestos-cement/clay pipe still being used everyday in the U.S.A. alone. An estimated 65 million people drink out of these water systems daily. A 1979 official test survey by the EPA found twenty percent of the cities examined had more than one million asbestos fibers per liter of water, with eleven percent of the cities having more than ten million fibers per liter of water. Studies in California and Canada link the ingestion of asbestos with an increased risk of cancer in the abdominal tract leading one to deduce that much colon cancer could be reduced and/or prevented by simply reducing or, even better, eliminating the amount of water borne asbestos from municipal pipes.

The human body is composed of from 70% to 80% water and requires a minimum of two quarts of water per day. Two quarts is what one uses up per day through urination, defecation, evaporation through the skin, and overall dehydration. This is the loss of water from an inactive individual. An athlete uses at least twice this amount or roughly at least four quarts per day. Depending on which informational research source is used, one researcher estimates that 75% of Americans are dehydrated and that 37% mistake thirst for hunger. A mere 2 percent drop in body water can trigger fatigue and mental dysfunction.

Steven Kay of the International Bottled Water Association said, "For this and other reasons, bottled water sales in the United States increased from 3.1 billion in 1995 to 4.6 billion in 1999." In 2000, water sales topped 5.4 billion. The sweetheart of water sales from 2000 to 2001 was oxygenated water, which increased in sales by 45 percent. This culminated in over 100 million bottles being sold by the end of 2001. This unique niche of bottled water, with recent increased advertising and customer education on research regarding oxygenated waters' benefits to the body, may leave expectations of sales in the dust and push actual sales beyond anyone's wildest dreams. Coupled with humankinds' creation of urban deserts in many of today's cities, all water and beverage sales are poised to skyrocket.

With over 70,000 chemicals, all created by man and in use daily, and with an estimated 1000 new chemicals being developed each year, it is obvious why we are living in a chemical bath of our own creation. A recent study by the Clean Water Network reported that one-third of our rivers, one-half of our estuaries, and more than one-half of our lakes are not fit for fishing and swimming-forget the idea of drinking the water.

According to the Center for Disease Control, every year an estimated 120 million Americans drink tap water contaminated with waterborne diseases and known cancer causing chemicals. After undertaking one of the most comprehensive water research studies ever conducted, the Natural Resources Defense Council in 1993, found that each year more than 900,000 people in the U.S. became ill. As many as 900 of these people actually die from these waterborne diseases. The United States Environmental Protection Agency (EPA) lists over 700 toxic chemicals that can be found in our nations' tap waters. Beginning in 1976, the EPA has monitored the amount of toxins in the fat tissue of Americans; on a consistent basis, thirteen very highly toxic compounds are found in 100 percent of all the people analyzed. The EPA continues to conduct this analysis every year.

The EPA and several other governmental agencies state that they only permit chemical levels that are considered "safe" in our public water supplies. It is interesting that at every urban EPA office there is always bottled water available for drinking. The fact that our government cannot adequately protect everyone who drinks publicly supplied water is one of the main reasons that bottled water and in-home water filters have become such a huge booming business.

Over the next twenty years, the Water Infrastructure Network has estimated that $490 billion dollars will be necessary to repair and maintain public drinking water systems throughout the United States. What most Americans and people in general do not know about is the disaster that has already begun in our oldest cities. The clay pipes, many laced with asbestos to hold the clay together, have eroded to the degree that dirt and contaminants are entering into the water system. The asbestos has been tested at 70 parts per million in one liter of water in several locations. It is obvious why the bottled water business made over 7 billion dollars last year by the peoples' effort to avert drinking water problems, some not even discussed herein.

Oxygen, the most vital element of life itself, is also the key to good health. We can live without water for weeks and go without food for months, but we can survive for only minutes without oxygen. Oxygen is the life-giving, life sustaining element. Approximately 90% of the body's energy is created by oxygen. All of the activities of the body, from brain function to elimination, are regulated by oxygen. Our ability to think, feel and act comes from the energy created by oxygen. The best way to optimize health is to be sure that we oxygenate every cell in our body. The more oxygen we have in our system, the more energy we produce. This is more important today than ever before, because of a general deficiency of oxygen intake directly related to the overall lack of exercise for the average person.

One of the many reasons for a lack of oxygen is our polluted atmosphere. Other reasons for oxygen depletion in the body include: planetary deforestation; devitalized soil; processed foods and poor diet; a clogged colon; automobile emissions; vitamin and mineral deficiencies; lack of exercise; chlorinated water; bacterial and fungal infections in the body; chemical pollutants; stress; poor posture and breathing habits; and electronic smog.

There is less oxygen today (on an average) in our bodies' systems to enable production of vital metabolic energy than ever recorded. It is extremely important that we increase our intake of oxygen if we are going to function on a level that gives our brain and body a chance to operate at peak levels.

The power of added oxygen in water was first evidenced over twenty years ago when European athletes dominated the world sports arena with the Soviet Union clearly leading the pack. Chilled water with oxygen added under pressure enabled the Soviet athletes to increase the oxygen level in their bloodstream and lower pulse rates by as much as 2 to 15 beats per minute. In addition, these athletes increased overall energy levels, biological performance, and stamina. When oxygen content is low in the body, the body becomes tired, weaker, and endurance is compromised. The Soviets outperformed the American athletes and we did not know how this was achieved at the time. It took several years for us to catch up to what the Soviets knew in the early 1970's. Knowledge of oxygenation and water structure are the keys to understanding water's biological behavior.

Blood plasma holds approximately three percent dissolved oxygen and red blood cells (hemoglobin) hold ninety seven percent. From the red blood cells the oxygen passes out into the plasma and is transferred to cells that need oxygen during metabolic processes. These cells pass $CO_2$ back to the plasma where it is then picked up by the red blood cells. Free oxygen in the blood then becomes the purging agent to clean and purify the blood. However, there must be enough free oxygen in the blood to enable this process. Many times, there is too much environmental pollution to allow for this excess free oxygen in the blood, and this is where OSIRIS water/liquid has a tremendous place in the market of oxygenated water (virtually including almost every person in the world).

SUMMARY OF THE INVENTION

An object of the invention is to solve at least the above problems and/or disadvantages and to provide at least the advantages described hereinafter.

To adequately and sufficiently oxygenate and structure water insofar that when consumed, whether by internal or external absorption, there is a distinct and definite increase in hydration, oxygenation and healthy metabolic changes regarding organic life processes.

In order to achieve at least the above objects, in whole or in part, and in accordance with the purposes of the invention, as embodied and broadly described, a cone system is provided in accordance with an embodiment of the invention that includes a source of oxygen, and a plurality of cones in communication with the source of oxygen and configured to receive preconditioned water and spin the preconditioned water to combine it with oxygen received from the source.

To further achieve at least the above objects, in whole or in part, and in accordance with the purposes of the invention, as embodied and broadly described, a method of spinning water and oxygen to produce super-oxygenated and structured water is provided in accordance with an embodiment of the invention that includes receiving preconditioned water, combining the preconditioned water with oxygen, passing the preconditioned water/oxygen combination through a cone system that spins the combination, and outputting super-oxygenated and structured water.

Additional advantages, objects, and features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

BRIEF DESCRIPTION OF THE DRAWINGS

The invention will be described in detail with reference to the following drawings in which like reference numerals refer to like elements wherein:

FIGS. 5E–5G are front and side views of a ring shown in FIG. 5C;

FIG. 6A is a schematic side view of a first magnetic structuring stage for a structured oxygen generating machine, in accordance with an embodiment of the invention;

FIG. 6B is a schematic side view of a second magnetic structuring stage for a structured oxygen generating machine, in accordance with an embodiment of the invention;

DETAILED DESCRIPTION OF PREFERRED EMBODIMENTS

Figure 1A:
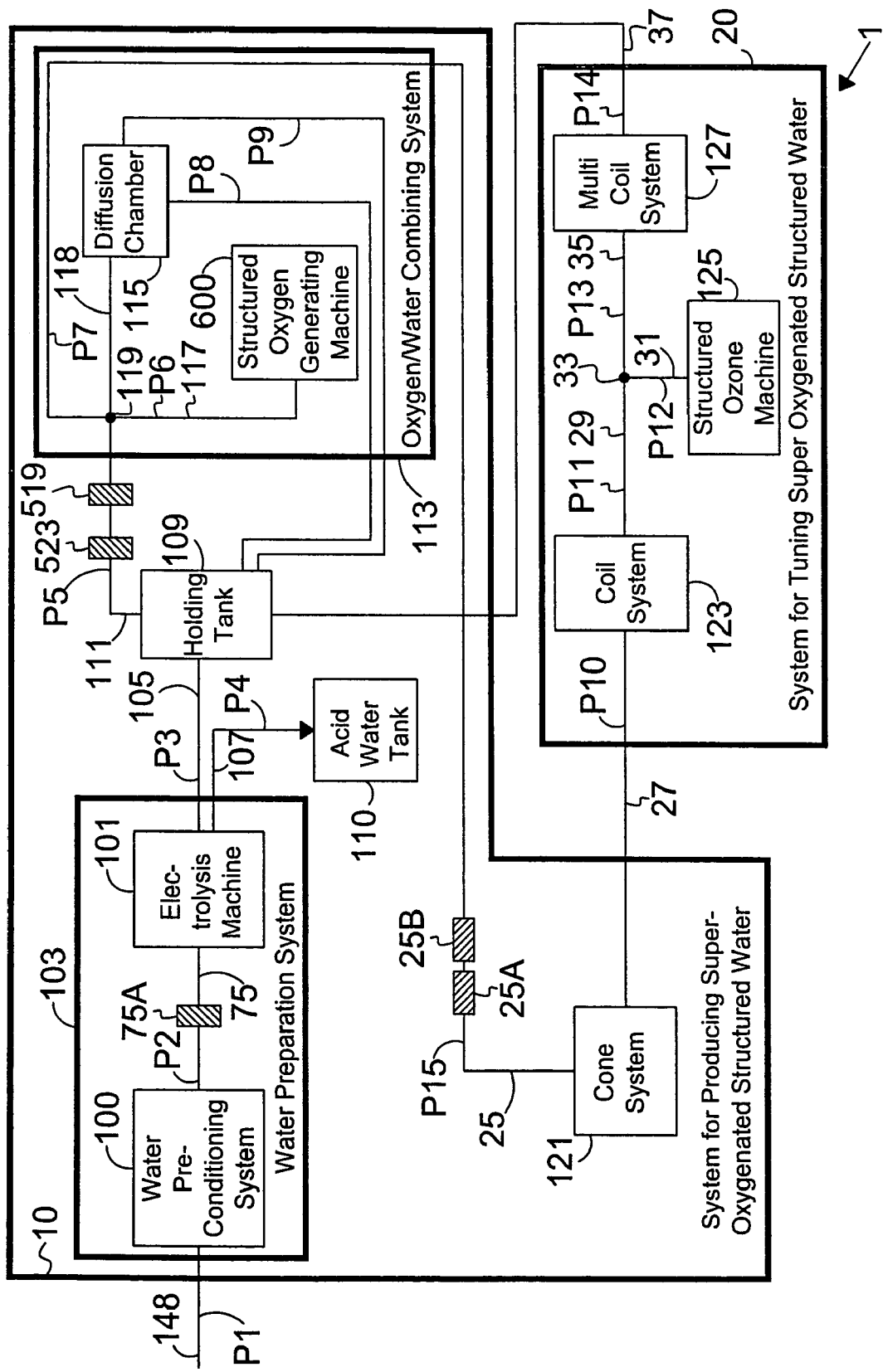
FIG. 1A is a block diagram of a system for making and tuning super-oxygenated and structured water, in accordance with an embodiment of the invention.

The process and apparatus of the present invention are also suitable for use in aerobic processes and other processes such as therapeutic processes advantageously employing oxygen containing liquids.

As used throughout the specification and the claims, reference to an "aerobic" process generally includes all chemical and microbiological processes in which such a process is carried out or is promoted in a liquid medium in the presence of oxygen. As used throughout the specification and the claims "therapeutic" processes involve the oxygenation of the body or its parts by treatment with an agent in a liquid vehicle containing dissolved oxygen.

Suitably aerobic processes in which water oxygenated in accordance with the present invention can be employed include, for example, processes in which heretofore water has been aerated such as by bubbling air thereinto, and also in situ or ex situ bioremediation of contaminated (e.g. with petroleum products) surface and ground waters; wastewater, sludge, and animal waste treatment, both by fixed film and by suspended growth methods; rehabilitation of atrophying lakes; biochemical oxygen demand (BOD) measurement techniques; fresh water aquaculture (e.g. fish farming); odor suppression barriers for anaerobic processes; and insolubilization of dissolved contaminants (e.g. Fe., and Mn ions) for removal by filtration or sedimentation.

In view of the particularly good oxygen retention of liquids oxygenated by the present invention kept in containers, a particularly advantageous new aerobic use of those liquids was discovered. In accordance with a further feature of the present invention, such oxygenated liquids can be advantageously employed as the fermentation liquor of all kinds of fermentation processes, such as drug production or food processing by microorganisms.

Microorganisms, such as bacteria, consume massive quantities of oxygen in the process of assimilating or breaking down waste. The rate at which oxygen can be introduced into the biomass is a substantial limiting factor on how quickly a breakdown by oxygenation can be achieved. The problem with known process technologies is that oxygen introduction by aeration is highly inefficient because air contains only 21% percent oxygen. Thus, 79% percent of the energy used by aerators is wasted in pumping useless nitrogen. Therefore, the use of highly oxygenated water, in accordance with the present invention, in such aerobic processes is expected to be about 5 times more efficient, also to obtain thereby a like extent of energy efficiency improvement. The dissolved oxygen content of water treated with embodiments of the present invention can be greater than 20 ppm, can be greater than 40 ppm, can be greater than 60 ppm, can be greater than 80 ppm, can be greater than 100, ppm, can be greater than 120 ppm, and can be greater than 140 ppm. Thus, the infusion of water with 40–50 mg/l of oxygen allows for a considerably more efficient and much more rapid aerobic treatment, compared to 7–10 mg/l for the normal oxygen content of water, and just slightly more when a conventional bubbling aerator is used with 20% oxygen containing air. Furthermore, as the equilibrium oxygen content of water is used up, its dissolved oxygen content rapidly decreases.

Another property of embodiments of the water involves its increased density. The increased density can be described using the term "cluster factor", that can be defined by relative density to double distilled water minus 1.0, then multiplied by 100,000. The cluster factor of water treated with embodiments of the present invention can be greater than 150, can be greater than 200, can be greater than 250, can be greater than 300, and can be greater than 350.

Another property of embodiments of the water involves its pH. The pH of water treated with embodiments of the present invention, as measured by litmus paper, can be between 7.5 and 8.5. The pH of water treated with embodiments of the present invention, as measured by a standard glass electrode pH meter, can be between 9.2 and 9.5.

Suitable therapeutic processes in which liquids made in accordance with the present invention can be advantageously employed include, for example, increasing the oxygen content of blood and tissues; oxygenation of wounds to increase the rate of healing and to reduce infections; oxygenated organ transplant storage media; tumor oxygenation for radiation therapy and chemotherapy; lung bypass by oxygenated liquids in case of pulmonary deficiencies; carbon monoxide poisoning; mouthwashes; dentifrices; topical, including cosmetic, treatment media; contact lens treating solutions; and cell level therapeutic applications.

In view of the especially good oxygen retention of liquids oxygenated by the present invention kept in containers, a particularly advantageous new therapeutic product of those liquids was discovered. In accordance with a further feature of the present invention, such oxygenated liquids can be employed as solvents for physiological saline isotonic solutions, especially when kept in sealed, sterile containers.

In cosmetics and toiletries, the liquids of the present invention may be incorporated into a beauty product in process by addition, mixing, wetting and other methods in the course of production of the beauty product.

In this case, the state and form of the cosmetics and toiletries are not specifically limited. For example, the liquids of the present invention may be used as is, may be used in a state diluted with double distilled water, alcohol or the like, and may be used in a gel or paste state obtained by adding a thickener, which processing are conducted for improvement on handle-ability, and in other states and forms in use. The water may be mixed into a beauty product in a liquid state as is, or it may be diluted or concentrated prior to the use as desired.

The state and form as a commodity of a beauty product in the present invention is not specifically limited as far as the beauty product is a beauty product into which a liquid of the present invention is mixed, and a beauty product of the present invention has only to be processed in a similar state and form to those of a known beauty product. Concrete examples thereof in which the liquid can be used include a non-drug product, a skin-care product, a makeup product, a hair care product, fragrance, a body care product, an oral care product and the like.

Examples thereof further include a face cleansing cream, a toilet lotion, a milky lotion, cream, gel, essence, pack, mask, foundations, lip sticks, cheek rouges, a brow, eye beauty product, manicure enamels, a shaving lotion, a hair washing product, a hair raising agent, a hair makeup product, a perfume, cologne, soap, a liquid body cleaning agent, a sun care product, a hand care product, a bath product, a tooth paste, and an oral cleaning agent.

The cosmetics and toiletries of the present invention contain a liquid of the present invention mixed therein as a feature, while no specific limitation is placed on other components, and additives currently used in cosmetics and toiletries can be properly mixed in.

Concrete examples of other components include hydrocarbons, such as squalane, liquid paraffin and the like; animal/vegetable oils, such as olive oil, beef tallow and the like; esters, such as isopropyl myristate, cetyl octate and the like; natural animal/vegetable waxes, such as carnauba wax, beeswax and the like; surfactants, such as glycelyl stearate, and sorbitan stearate; silicone oils, such as dimethylpolysiloxane, methylphenylpolysiloxane and derivative thereof; fluorine containing resins, such as perfluoropolyether and the like; alcohols, such as ethanol, ethylene glycol, glycerin and the like; water-soluble polymers, such as carboxyvinyl polymer, carrageenan, carboxymethyl cellulose sodium and the like; proteins, such as collagen, elastin and the like and hydrolyzates thereof; powders of titanium dioxide, zinc oxide, talk, mica, silicic anhydride, nylon powder, alkyl polyacrlylate, powder of alumina, iron oxide and the like; an ultraviolet absorbent; vitamines; an antiphlogistic agent; amino acids and derivative thereof; lecithin; a colorant; a perfume; an antiseptic agent; an antioxidant and the like.

The extent of cosmetics and toiletries in the sense of words has been extended because of recent diverse requirements therefor, and cosmetics and toiletries of the present invention are not necessarily strictly restricted in respect of the definition thereof. That is, cosmetics and toiletries of the present invention means cosmetics and toiletries in a general sense into which an activating agent of the present invention is properly mixed. Therefore, cosmetics and toiletries of the present invention include all products by which a liquid of the present invention is taken into the body of an organism in a manner of transdermal or endermic absorption.

Food additives related to the present invention are characterized by that in which a liquid of the present invention is mixed thereinto and a food additive is added, mixed or incorporated by wetting or similar method into a food or a beverage in the course of production of the food or the beverage for the purpose of processing or preservation of the food or the beverage. A state and a form of a food additive is not specifically restricted to a particular pair and, for example, the water may be used in mixing into a sweetener, a sourness flavoring, a bitterness flavoring, a deliciousness flavoring, an oiliness flavoring and the like at a proper content. The water may also be used in a gel or paste state processed by adding a thickener or the like for improvement on handle-ability, may be used in a liquid state of 100%, or may be used in a dilute or concentrated state as well.

To be more detailed, a food additive related to the present invention can be to satisfy a person's preference and to prevent modification, or rotting of a food. That is, the food additives may be necessary for production, improvement on quality, preservation of quality and nutrition enhancement, while a state and a form in processing may be similar to those of known food additives. Concrete examples thereof include flavorings, such as a saline solution, salt, a sauce, drips, a soupe, an original broth and the like; a preserving agent; a production auxiliary; a filtering auxiliary; a clarificant; a quality sustaining agent; a sterilizing agent; an antimicrobial agent; a disinfectant and the like.

Note that in order to further improve a quality of a food additive of the present invention, the inventive water agent is preferably processed into the food additive in a working condition, in which the intermediate is brought into contact to the external air (oxygen) on the lowest possible level or in a low temperature condition. For example, the processing is preferably conducted in a condition in which no activity of mineral components is degraded, such as in a nitrogen atmosphere, at a low temperature or in a freeze drying condition. The food additive as processed is preferably immediately and in a short time packed, so as to be brought into contact with oxygen on the lowest possible level, for example in a vacuum package, in a nitrogen-filled package or in gas-tight package with an antioxidant therein. Such packages are preferably adopted, since the beneficial effects of the inventive water can be sustained over a long term.

A food related to the present invention is a food in which a liquid or a food additive of the present invention is added as a feature. Since foods can be mixed with a liquid or a food additive under various categories, such as an agricultural food, a livestock food, a fishery food, a fermented food, a canned food, an instant food and the like, according to states and forms of respective food additives described above, no specific limitation is imposed on a kind, and state and form of food related to the present invention. Concrete examples of foods that can be named include breads, noodles, bean curd, a dairy product, a meat processed product, soy source, miso, edible fat and oil, an oil and fat processed product, a fish paste product, sweet stuff, vegetables, pickles and the like. Concrete examples of addition methods and products applied therewith that can be named include: soy source obtained by mixing inventive water into soybean, wheat and seed koji to ferment them and miso obtained by mixing processed inventive water into soybean, rice and barley to ferment them.

Further examples of foods of the present invention include bean curd obtained by using the inventive water as a brine for coagulation of soybean milk, pickles obtained by using the inventive water as a salty component in a solution, a food added with an inventive liquid or a food additive for retaining freshness and a food immersed in an inventive liquid or a food additive for retaining freshness.

Still further examples of foods of the present invention include nutritional supplements and the like such as health foods in states and forms including liquid, powder, a tablet, a capsule, in which the inventive liquid or food additive is incorporated.

A beverage related to the present invention is a beverage in which a water of the present invention and/or a food additive of the present invention is added as a feature. Since, as to a kind, state and form of beverages related to the present invention, a inventive liquid or a food additive can be added to various kinds of beverages according to a kind, state and form thereof, no specific limitation is imposed on a kind, state and form of beverage. Examples thereof that can be named include alcoholic beverages such as brewed sake, synthetic sake, shochu, sweet sake, beer, whisky, liqueur, fruit liquor and the like, and favorite soft beverages or refreshing beverages such as fruit juice, concentrated fruit juice, nectar, soda pop, cola beverage, teas, coffee, black tea and the like.

Note that in order to further improve a quality of a food and a beverage related to the present invention, the inventive liquid is preferably processed into foods or beverages in a working condition in which the intermediate is brought into contact to the external air (oxygen) on the lowest possible level or in a low temperature condition. For example, the processing is preferably conducted in a condition in which no activity of mineral components is degraded, such as in a nitrogen atmosphere, at a low temperature or in a freeze drying condition. Preferably, the food additive as processed is immediately and in a short time packed so as to be brought into contact with oxygen on the lowest possible level, for example in vacuum package, in nitrogen-filled package or in gas-tight package with an antioxidant therein. Such packages are preferably adopted since the benefits of the inventive liquid can be sustained over a long term.

The boundaries between a food additive, a food and a beverage in the sense of words have been ambiguous because of recent diverse requirements for foods. For example, since miso, soy source and the like are flavorings (food additives) and foods, sake classified in alcoholic beverages is a food and a beverage, and sweet sake classified in alcoholic beverage is also flavoring (food additive). Therefore, the boundaries in a food additive, a food and a beverage related to the present invention are not necessarily strictly restricted in respect of the definition thereof. That is, food additives, and foods and beverages of the present invention in principle means food compositions in a general sense into which a liquid of the present invention is properly mixed. Accordingly, food compositions of the present invention include all products through which an inventive liquid is taken into the body of an organism in a manner of oral uptake.

It will be recognized by those skilled in the art that the water/liquids of the present invention can be further modified in any number of ways. For example, following formation of structured water, the water may be oxygenated as described herein, further purified, flavored, distilled, irradiated, or any number of further modifications known in the art and which will become apparent depending on the final use of the water.

In another embodiment, the present invention provides methods of modulating the cellular performance of a tissue or subject. The inventive water (e.g., oxygenated microcluster water) can be designed as a delivery system to deliver hydration, oxygenation, nutrition, medications and increasing overall cellular performance and exchanging liquids in the cell and removing edema.

It is also contemplated that the water of the present invention provides beneficial effects upon consumption by a subject. The subject can be any mammal (e.g, equine, bovine, porcine, murine, feline, canine) and is preferably human. The dosage of the water (or oxygenated water) will depend upon many factors recognized in the art, which are commonly modified and adjusted. Such factors include, age, weight, activity, dehydration, body fat, etc. Typically 0.5 liters/day of the water of the invention provide beneficial results. In addition, it is contemplated that the water of the invention may be administered in any number of ways known in the art including, for example, orally, topically, buccally, sublingually, parenterally, intramuscularly or intravenously, either alone or mixed with other agents, compounds and chemicals. It is also contemplated that the water of the invention may be useful to irrigate wounds or at the site of a surgical incision. The water of the invention can have use in the treatment of infections. For example, infections by anaerobic organisms may be beneficially treated with the oxygenated forms of the water. In another embodiment, the water of the invention can be used to lower free radical levels and, thereby, inhibit free radical damage in cells.

In one embodiment, the water may contain a sweetener (i.e., a compound that imparts a sweet taste but does not increase the blood glucose levels of the patient). Examples include a sugar alcohol and non-nutritive sugars. As used herein, the term sugar alcohol refers to reduced sugars. The preferred sugar alcohol are mono-saccharide alcohols and disaccharide alcohols. The monosaccharide alcohols have the formula HO—CH2 (CHOH)n-CH2OH, wherein n is 2–5. They also include tetritols, pentitols, hexitols and heptitols. Examples of sugar alcohols include erythritol, theritol, ribitol, arabinitol, xylitol, allitol, dulcitol, glucitol, sorbitol, mannitol, altritol, iditol, maltitol, lactitol, isomalt, hydrogenated starch hydrolysate and the like. The sugar alcohols, especially the monosaccharide alcohols, may be utilized as a racemic mixture or in the D or L form.

The non nutritive sweeteners are patentably sweet but are non-caloric. Examples include L-sugars, aspartame, alitame, acesulfame-K, cyclamate, stevioside, glycyrrhizin, sucralose, neohesperidin, dihydrochalcone, thaumatin saccharin and its pharmaceutically acceptable salts (e.g., calcium), and the like.

In one embodiment of the present invention, it is preferred that the sweetener be present in the water in amounts ranging from about 40% to about 80% by weight and more preferably from about 50% to about 70% and most preferably from about 55% to about 65%. In addition, it is preferred that the weight ratio of sweetener to alkyl hydroxyethyl cellulose, when present, ranges from about 400 to about 800, and, most preferably, from about 500 to about 600.

Other optional ingredients which may be present in certain waters of the present invention include buffers, such as citric acid or its corresponding salts or acetic acids and its salts, flavoring agents, such as peppermint, oil of wintergreen, orange, or cherry flavoring, and the like, surfactants, thickeners, preservatives, such as methyl and propyl parabens, and the like, anti-oxidants, such as benzoate salts, and the like, chelating agents, such as EDTA and its salts and the like.

In certain embodiments, the waters of the present invention can be administered to a mammal in need thereof by topical, systemic, subscleral, transscleral, or intravitreal delivery. Intravitreal delivery may include single or multiple intravitreal injections, or via an implantable intravitreal device that releases the water in a sustained capacity. Intravitreal delivery may also include delivery during surgical manipulations in treatment for retinal detachments, diabetic retinopathy, or macular degenerations as either an adjunct to the intraocular irrigation solution or applied directly to the vitreous during the surgical procedure.

Minimally invasive transscleral delivery can be used to deliver an effective amount of the water to the retina with negligible systemic absorption. Transscleral delivery utilizes the sclera's large and accessible surface area, high degree of hydration that renders it conductive to water-soluble substances, hypocellularity with an attendant paucity of proteolytic enzymes and protein-binding site, and permeability that does not appreciably decline with age. An osmotic pump loaded with the inventive water can be implanted in a subject so that the active compounds are transsclerally delivered to the retina in a slow-release mode. (Ambati, et al., Invest. Ophthalmol. Vis. Sci., 41: 1186–91 (2000)).

The inventive waters may also be administered topically by administering the active compounds to a patient by any suitable means, but are preferably administered by a liquid or gel suspension of the water in the form of drops, spray or gel. Alternatively, the water may be applied, for example to the eye, via liposomes. Further, the water may be infused into the tear film via a pump-catheter system. Another embodiment of the present invention involves the water contained within a continuous or selective-release device, for example, polymeric ocular inserts for the administration of drugs. (Alza Corp., Palo Alto, Calif.), or in the intravitreal implant for the gradual release of pharmaceuticals for the treatment of eye conditions (Bausch & Lomb, Claremont, Calif.).

As an additional embodiment, the inventive water can be contained within, carried by, or attached to contact lenses that are placed on the eye. Another embodiment of the present invention involves the water contained within a swab or sponge that can be applied to the desired surface. Another embodiment of the present invention involves the water contained within a liquid spray that can be applied to any desired surface, such as the ocular surface.

The inventive water may be administered systemically. The term "systemic" as used herein includes subcutaneous injection, intravenous, intramuscular, intraesternal injection, infusion, inhalation, transdermal administration, oral administration, and intra-operative instillation.

Liquid formulations containing water of the present invention may be sterile and non-sterile injectable formulations. For instance, the formulation may be an aqueous or oleaginous suspension. The suspensions may be formulated according to techniques known in the art using suitable dispersing or wetting agents and suspending agents.

The injectable formulation may also be a sterile injectable solution or suspension in a non-toxic parenterally-acceptible diluent or solvent. Suitable diluents and solvents for injectable formulations include 1,3-butanediol, Ringer's solution and isotonic sodium chloride solution. Sterile, fixed oils are conventionally employed as a solvent or suspending medium. Suitable fixed oils include, but are not limited to, synthetic mono- or di-glycerides, fatty acids, such as oleic acid and its glyceride derivatives, and natural pharmaceutically-acceptable oils, such as olive oil, castor oil, and polyoxyethylated derivatives thereof. (Sigma Chemical Co.; Fisher Scientific) According to a preferred embodiment, oil containing injectable formulations contain a long-chain alcohol diluent.

Topical formulations of the present invention are typically in the form of an ointment or suspension. Such formulations may be administered for diseases of the eye, the skin, and the lower intestinal tract. Suitable suspending agents, diluents, and dosing vehicles for such formulations include, but are not limited to, mineral oil, liquid petrolatum, white petrolatum, propylene glycol, polyoxyethylene, polyoxypropylene compound and emulsifying wax. (Sigma Chemical Co.; Fisher Scientific) Alternatively, the topical formulation can be in the form of a lotion or cream. Suitable suspending agents, diluents, and dosing vehicles for such formulations include, but are not limited to, mineral oil, sorbitan monostearate, polysorbate 60 cetyl esters wax, cetearyl alcohol, 2-octyldodecanol, and benzyl alcohol. (Sigma Chemical Co.; Fisher Scientific) Topical application for the lower intestinal tract can be effected in a rectal suppository formulation or in a suitable enema formulation. The formulation may also be administered via a transdermal patch as known in the art.

The liquid formulation containing the inventive water may also be applied ophthalmically. A preferred ophthalmic formulation of the present invention is a micronized suspension in isotonic, pH adjusted sterile saline. A preservative, such as benzalkonium chloride, may be included in the formulation but is not necessary as a preservative due to the nature of the invention. Alternatively, the ophthalmic formulation is in an ointment, for example, containing petrolatum.

Nasal aerosol and inhalation formulations of the invention may be prepared by any method in the art. Such formulations may include dosing vehicles, such as saline, preservatives, such as benzyl alcohol, absorption promoters to enhance bioavailability, fluorocarbons used in the delivery systems, e.g., nebulizers, etc., solubilizing agents, dispersing agents, or any combination of any of the foregoing.

The formulations of the present invention may be administered systemically. The term "systemic" as used herein includes parenteral, topical, oral, spray inhalation, rectal, nasal, bucal, and vaginal administration. The term "parenteral" as used herein includes subcutaneous, intravenous, intramuscular, intra-articular, intra-synovial, intrasternal, intrathecal, intrahepatic, intralesional and intracranial administration. Preferably, the compositions are administered orally, intraperitoneally or intravenously.

One systemic method involves an aerosol suspension of respirable particles comprising the inventive water, which the subject inhales. The water would be absorbed into the bloodstream via the lungs, and subsequently contact the lacrimal glands in a pharmaceutically effective amount. The respirable particles are preferably liquid, with a particle size sufficiently small to pass through the mouth and larynx upon inhalation. In general, particles ranging from about 1 to 10 microns, but more preferably 1–5 microns, in size are considered respirable.

Another method of systemically administering the active compounds to the eyes of a subject involves administering a liquid/liquid suspension in the form of eye drops or eye wash or nasal drops of a liquid formulation, or a nasal spray of respirable particles that the subject inhales. Liquid pharmaceutical compositions containing the inventive water for producing a nasal spray or nasal or eye drops may be prepared by combining the inventive water with a suitable vehicle, such as sterile pyrogen free water or sterile saline by techniques known to those skilled in the art.

The inventive water may also be systemically administered to eyes through absorption by the skin using transdermal patches or pads. In this embodiment, the inventive water is absorbed into the bloodstream through the skin.

Other methods of systemic administration of the inventive water involves oral administration, in which compositions containing the inventive water are in the form of lozenges, aqueous or oily suspensions, viscous gels, chewable gums, emulsion, soft capsules, or syrups or elixirs. Additional means of systemic administration of the inventive water to the eyes of the subject would involve a suppository form of the water, such that a therapeutically effective amount reaches the eyes via systemic absorption and circulation.

Further means of systemic administration of the inventive water involve direct intra-operative instillation of a gel, cream, or liquid suspension form of a therapeutically effective amount of the water.

For topical application, a solution containing the inventive water may contain a physiologically compatible vehicle, as those skilled in the ophthalmic art can select, using conventional criteria. The vehicles may be selected from the known ophthalmic vehicles which include, but are not limited to, saline solution, polyethers such as polyethylene glycol, polyvinyls such as polyvinyl alcohol and povidone, cellulose derivatives such as methylcellulose and hydroxypropyl methylcellulose, petroleum derivatives such as mineral oil and white petrolatum, animal fats such as lanolin, polymers of acrylic acid such as carboxypolymethylene gel, vegetable fats such as peanut oil, polysaccharides such as dextrans, glycosaminoglycans such as sodium hyaluronate, and salts such as sodium chloride and potassium chloride.

For systemic administration, such as injection and infusion, the pharmaceutical formulation is prepared in a sterile medium. The inventive water, depending on the vehicle and concentration used, can either be suspended or dissolved in the vehicle. Adjuvants such as local anaesthetics, preservatives and buffering agents can also be dissolved in the vehicle. The sterile injectable preparation may be a sterile injectable solution or suspension in a non-toxic acceptable diluent or solvent. Among the acceptable vehicles and solvents that may be employed are saline solution or Ringer's solution.

For oral use, an aqueous suspension may be prepared by addition of the inventive water to dispersible powders and granules with a dispersing or wetting agent, suspending agent, one or more preservatives, and other excipients. Suspending agents include, for example, sodium carboxymethylcellulose, methylcellulose and sodium alginate. Dispersing or wetting agents include naturally-occurring phosphatides, condensation products of an allylene oxide with fatty acids, condensation products of ethylene oxide with long chain aliphatic alcohols, condensation products of ethylene oxide with partial esters from fatty acids and a hexitol, and condensation products of ethylene oxide with partial esters derived from fatty acids and hexitol anydrides. Preservatives include, for example, ethyl, and n-propyl p-hydroxybenzoate. Other excipients include sweetening agents (e.g., sucrose, saccharin), flavoring agents and coloring agents. Those skilled in the art will recognize the many specific excipients and wetting agents encompassed by the general description above.

Formulations for oral use may also be presented as soft gelatin capsules wherein the inventive water is administered alone or mixed with an oil medium, for example, peanut oil, liquid paraffin or olive oil. Formulation for oral use may also be presented as chewable gums by embedding the active ingredient in gums so that the inventive water is slowly released upon chewing.

For rectal administration, the compositions in the form of suppositories can be prepared by mixing the inventive water with a suitable non-irritating excipient that is solid at ordinary temperatures but liquid at the rectal temperature and will therefore melt in the rectum to release the water. Such excipients include cocoa butter and polyethylene glycols.

FIG. 1A is a block diagram of a system for making and tuning super-oxygenated and structured water, in accordance with one embodiment of the present invention. The system 1 includes system 10 for producing or making super-oxygenated and structured water coupled via pipe 27 to a system 20 for tuning super-oxygenated and structured water. The term pipe refers to any component configured to provide fluid or gaseous communication between two components. The pipe may be, for example, a PVC pipe, a crystal pipe, flexible tubing, or other type of conduit.

System 10 includes a water preparation System 103 coupled to an oxygen/water combining System 113 via a holding tank 109. Oxygen/water combining System 113 is in turn coupled to a cone System 121 via holding tank 109. System 20 for tuning super-oxygenated and structured water includes a coil System 123 coupled to a structured ozone machine 125 and multi-coil system 127.

Water preparation System 103 includes a water preconditioning system 100 and an electrolysis machine 101 coupled by a pipe 75, which together comprise a system for preparing water with a stable negative oxidation reduction potential (ORP). Output of system 103, in particular, from electrolysis machine 101, is either alkaline water, which is output via a pipe 105 to holding tank 109, or acidic water, which is output via a pipe 107 to an acid water tank 110. Both the alkaline water output via pipe 105 and the acidic water output via pipe 107 have a stable negative oxidation reduction potential (ORP). The alkaline water is input to holding tank 109, which is in turn output via a pipe 111 to the oxygen/water combining system 113. Holding tank 109 may be a single tank or a plurality of tanks, for example, three tanks arranged in series. A pump 523 and pressure gauge 519 are preferably provided between the holding tank 109 and the oxygen/water combining System 113 to control the flow of water from the holding tank 109 to the oxygen/water combining system 113.

The oxygen/water combining System 113 includes a structured oxygen generating machine 600 and a diffusion chamber 115. The structured oxygen generating machine 600 outputs oxygen via a pipe 117, which is coupled to pipe 111 and pipe 118 by a valve 119. Water and oxygen flow together from valve 119 to the diffusion chamber 115 via pipe 118. The oxygen/water combining System 113 outputs oxygen enriched water to cone System 121 via pipe 25.

As set forth above, the system for tuning super-oxygenated and structured water 20 is coupled to the system for producing super-oxygenated and structured water 10 via pipe 27. The system for tuning super-oxygenated and structured water 20 includes coil system 123, structured ozone machine 125, and multi-coil system 127. Coil System 123 receives the oxygen enriched water from system 10 via pipe 27, and combines and outputs oxygen enriched water via a pipe 29. Structured ozone machine 125 outputs structured ozone via a pipe 31, which is coupled to pipe 29 and pipe 35 by a valve 33. The structured ozone from structured ozone machine 125 is combined with the super-oxygenated and structured water in pipe 29 at valve 33 and the combination of structured ozone and super-oxygenated and structured water is directed via pipe 35 to multi-coil system 127.

Coil System 123 tunes water received via pipe 27, and multi-coil system 127 tunes the combined water and ozone received via pipe 35 to yield super-oxygenated and structured water that is output via pipe 37. Pipe 37 returns the super-oxygenated and structured water to holding tank 109, from which the water may be, for example, bottled for human consumption or other uses.

Water preconditioning system 100, oxygen/water combining system 113, including structured oxygen generating machine 600 and diffusion chamber 115, cone system 121, coil system 123, structured ozone machine 125, and multi-coil System 127 will be described in more detail below.

Figure 1B:
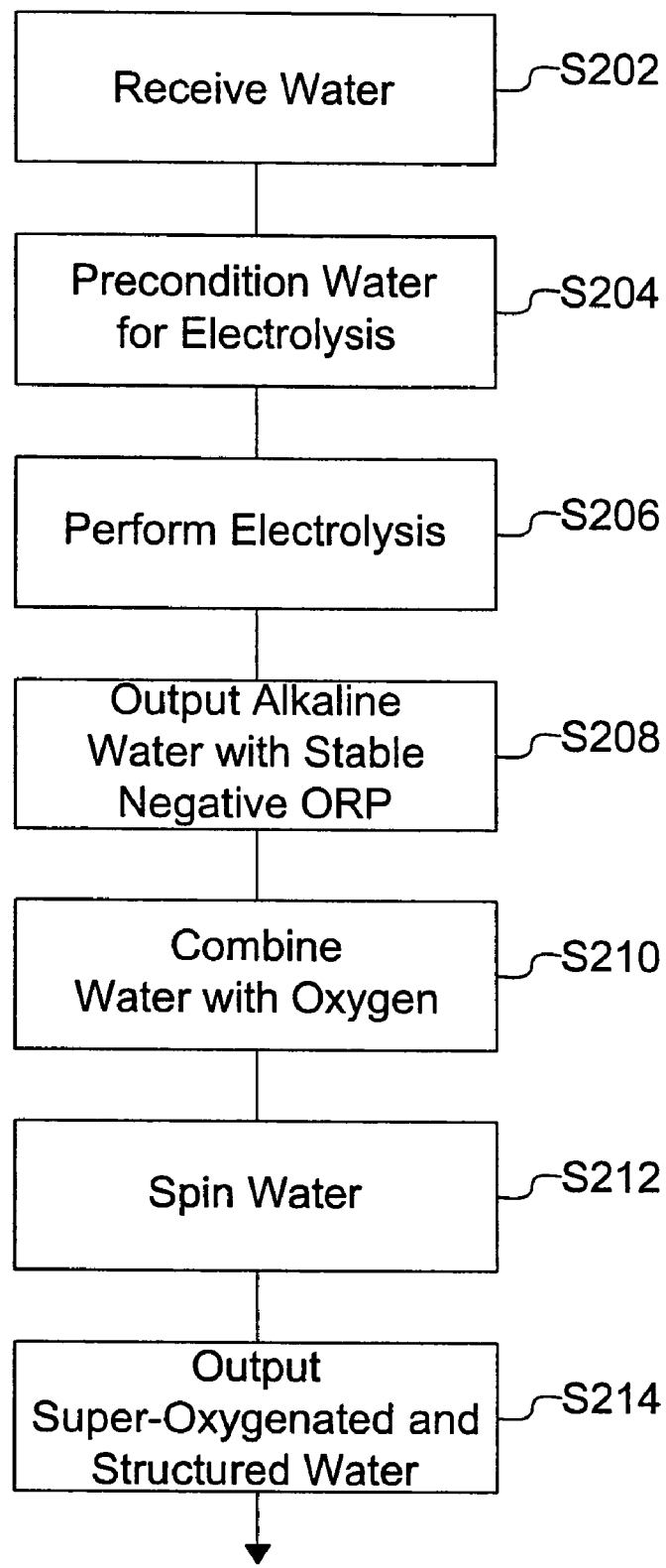
FIGS. 1B–1C are flow charts of methods for making super-oxygenated and structured water, in accordance with an embodiment of the invention.
Figure 1C:
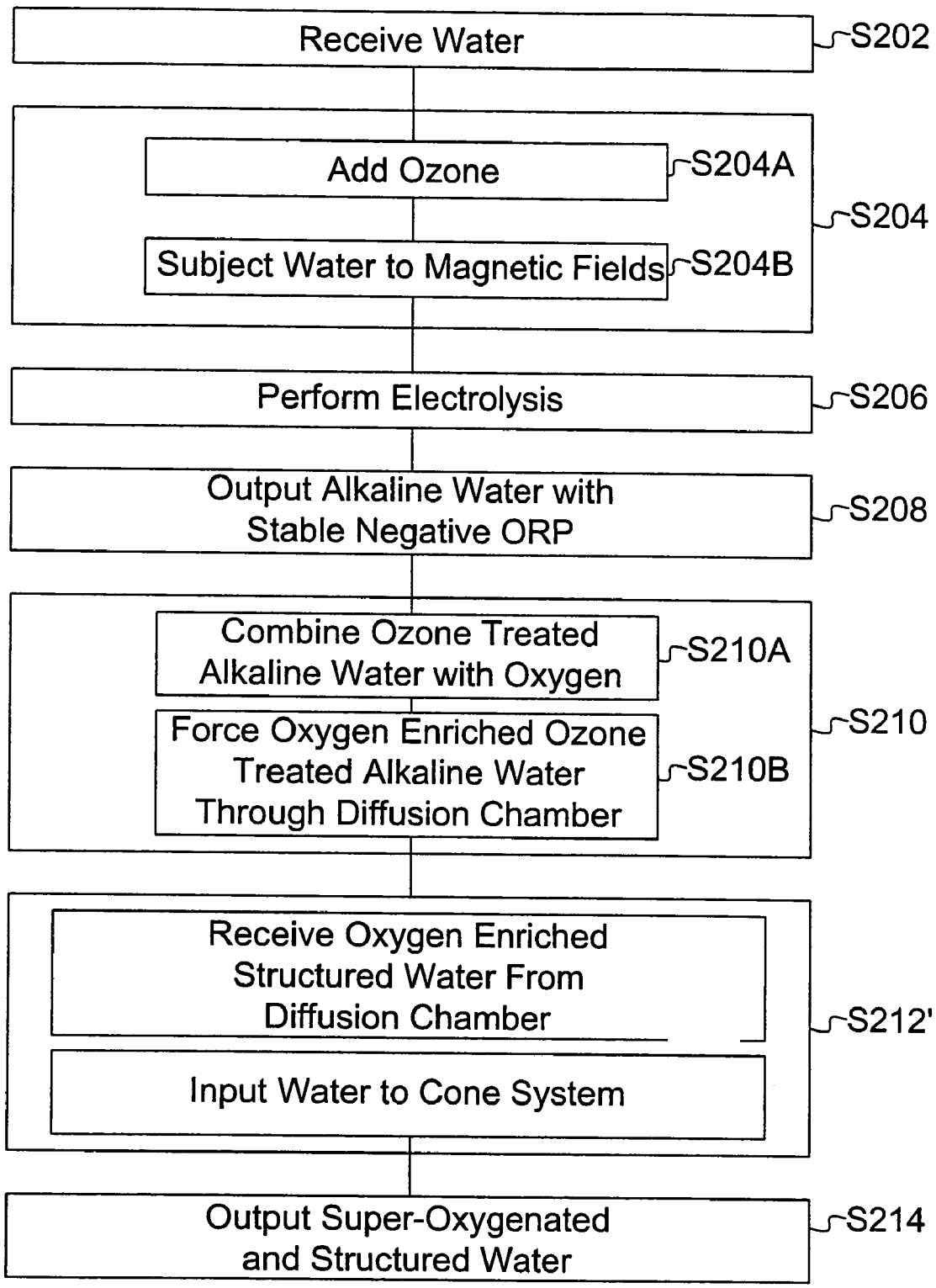

FIG. 1B is a flow chart of a method for producing super-oxygenated and structured water, in accordance with one embodiment of the present invention, and FIG. 1C is a flow chart of a more detailed method for producing super-oxygenated and structured water, in accordance with one embodiment of the present invention. Referring to FIG. 1B, step S202 involves receiving water from pipe 148 by System 103 for preparing water with stable negative ORP. Water preconditioning System 100 in System 103 preconditions water for electrolysis at step S204. Electrolysis machine 101 performs electrolysis at step S206. System 103 for preparing water with a stable negative ORP outputs alkaline water with its stable negative ORP via pipe 105 into holding tank 109 at step S208. At step S210 water with a stable negative ORP is received from holding tank 109 and is combined with oxygen at oxygen/water combining system 113. At step S212, the combined oxygen/water is received and spun by cone system 121. Finally, at step S214, oxygen enriched structured water is output from cone system 121.

FIG. 1C is a flow chart of a more detailed method for producing super-oxygenated and structured water, in accordance with one embodiment of the present invention. In particular, step S204 from FIG. 1A includes two substeps S204a and S204b for preconditioning water. In particular, step S204 for preconditioning water involves adding ozone to the water at step S204a, followed by subjecting the water to magnetic fields at step S204b.

Step S210 of FIG. 1B, during which water is combined with oxygen, is subdivided in FIG. 1C into step S210a, in which ozone treated alkaline water is combined with oxygen, followed by step S210b, in which oxygen enriched ozone treated alkaline water is forced through the diffusion chamber 115.

Step 212 of FIG. 1B, during which water is spun, is shown in FIG. 1C as step S212', in which oxygen enriched structured water is received from the diffusion chamber 115 and input into the cone system 101.

Figure 1D:
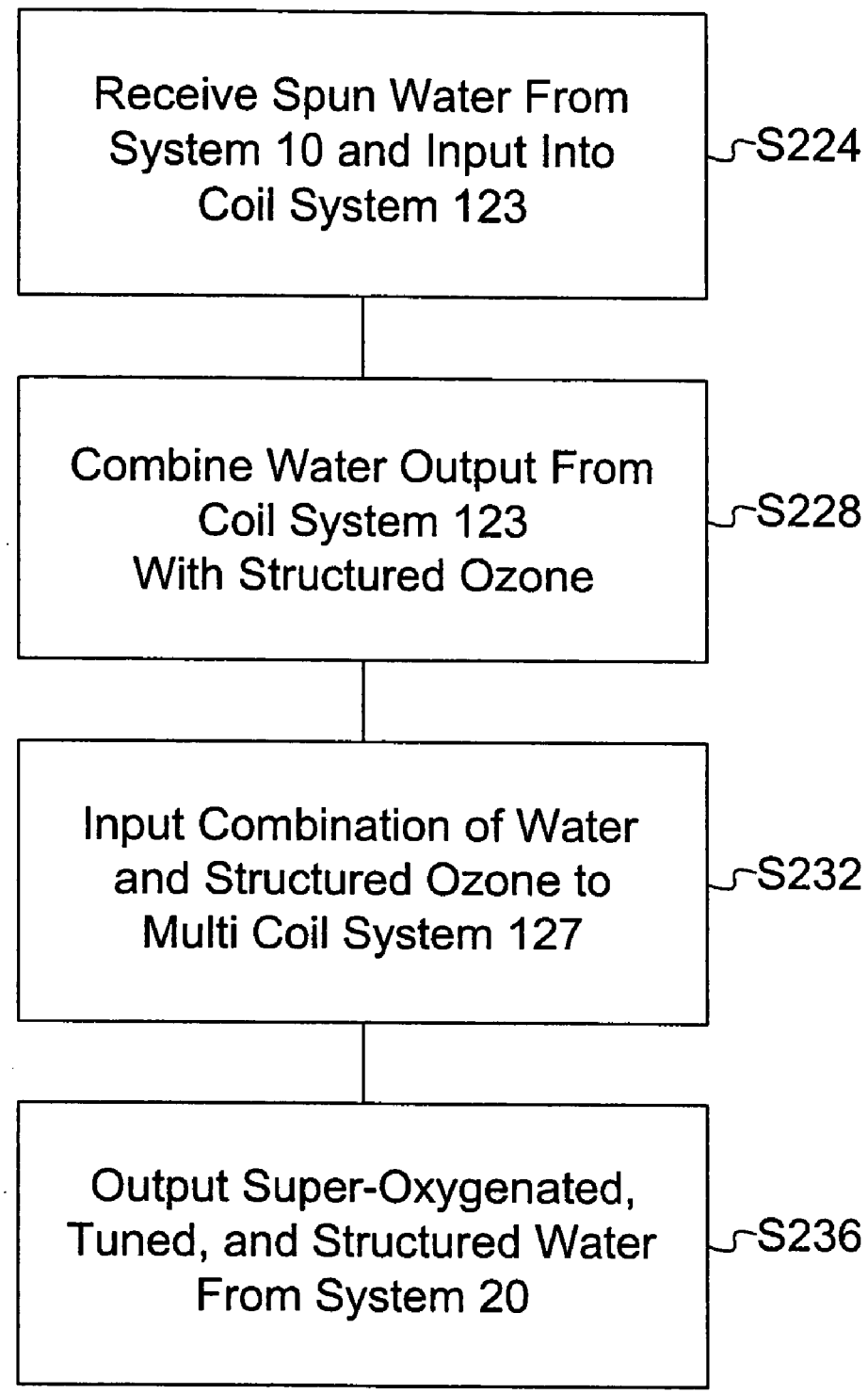
FIG. 1D is a flow chart of a method for tuning super-oxygenated and structured water, in accordance with an embodiment of the invention.

The system for tuning super-oxygenated and structured water 20 performs the steps shown in FIG. 1D as follows. At step S224 spun water is received from the system for producing super-oxygenated and structured water 10, and is input into coil system 123. The water output from the coil System 123 via pipe 29 is then combined with structured ozone received from structured ozone machine 125 via pipe 31 at step S228. The combination of water from coil System 123 and the structured ozone from structured ozone machine 125 is input to multi-coil System 127 via pipe 35 at step S232. Finally, at step S236, super-oxygenated, tuned, and structured water is output from the system 20 and, in particular, from multi-coil system 127.

Figure 2A:
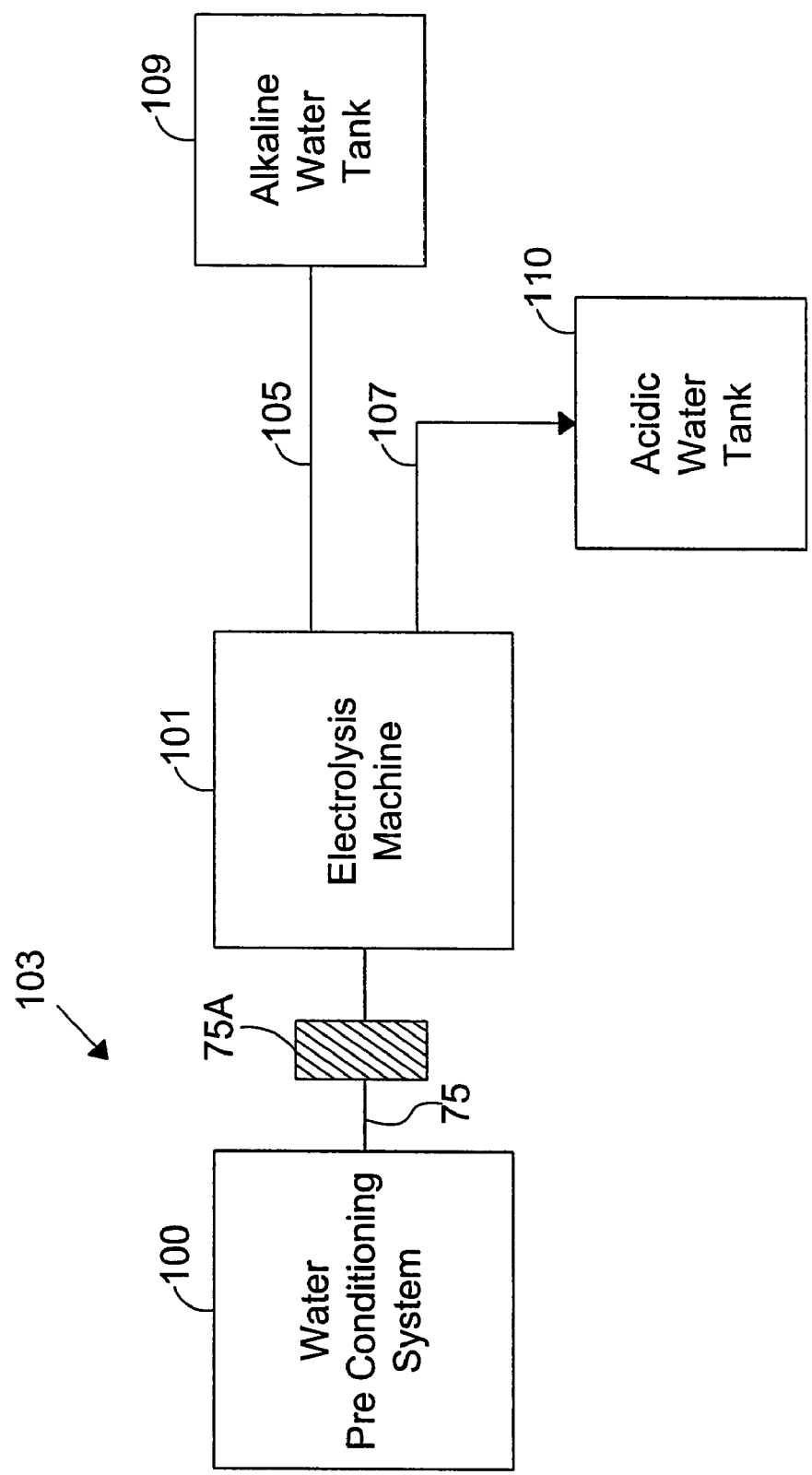
FIG. 2A is a block diagram of a system for preparing water with a stable negative ORP, in accordance with an embodiment of the invention.

FIG. 2A is a block diagram of the system for preparing water with a stable negative ORP 103. System 103 includes water preconditioning System 100 and electrolysis machine 101. As discussed above, water preconditioning System 100 outputs water preconditioned for electrolysis machine 101 via pipe 75. A cut off valve 75A may be provided on pipe 75 to control the flow of the water. The preconditioned water is, in turn, received by electrolysis machine 101, and electrolysis is performed thereon to yield both alkaline water output through pipe 105 to holding tank 109 and acidic water output through pipe 107 to acidic water tank 110. As discussed above, both the alkaline water and acidic water have a stable negative ORP.

The acidic water output via pipe 107 is not designed for consumption, but it has many other uses and advantages. For example, acidic water can be used for cleaning many things, such as pipes, etc. It can also be mixed with hair rinse. The mixture can vary from pH 4.0 to pH 6.5 (6.7) and preferably between ~4 parts per volume of water to ~1 part per volume of hair rinse all the way to ~1 part per volume of water to ~4 parts per volume of hair rinse, and more preferably ~1 part per volume of water with ~1 part per volume of hair rinse. It can also be used in the same manner mixed with shampoo because it acts as a reagent and helps clean oils out of hair.

Typically, when water is output from an electrolysis system, the negative ORP that is created does not stay very long. It typically only remains for minutes at a time. The negative ORP of water treated with embodiments of the present invention can be less than −100. For both the alkaline and the acidic water at pipes 105 and 107, respectively, typically the negative ORP begins at ~183 ORP. However, as the water settles out, some of the electrons are given off due to a variety of reasons, and it ultimately settles out at approximately ~−170 ORP to ~−173 ORP. Both the alkaline and acidic water can maintain ~−170 to ~−173 ORP for 6 months to up to ~2 years or more depending on the electromagnetic environment next to or near the storage area. Water in this state gives a multitude of free electrons which then can become an antioxidant in the blood. At this point the water, both the alkaline water and the acidic water, have structure. If the water in holding tank 109 is not processed within ~24 hours, the structure begins to deteriorate, although the negative ORP remains, as discussed above. Accordingly, for structure purposes, it is advantageous to continue processing the alkaline water in holding tank 109 as quickly as possible. That is, it is advantageous to proceed to output the alkaline water in holding tank 109 via pipe 111 to the oxygen/water combining System 113 as quickly as possible.

Figure 2B:
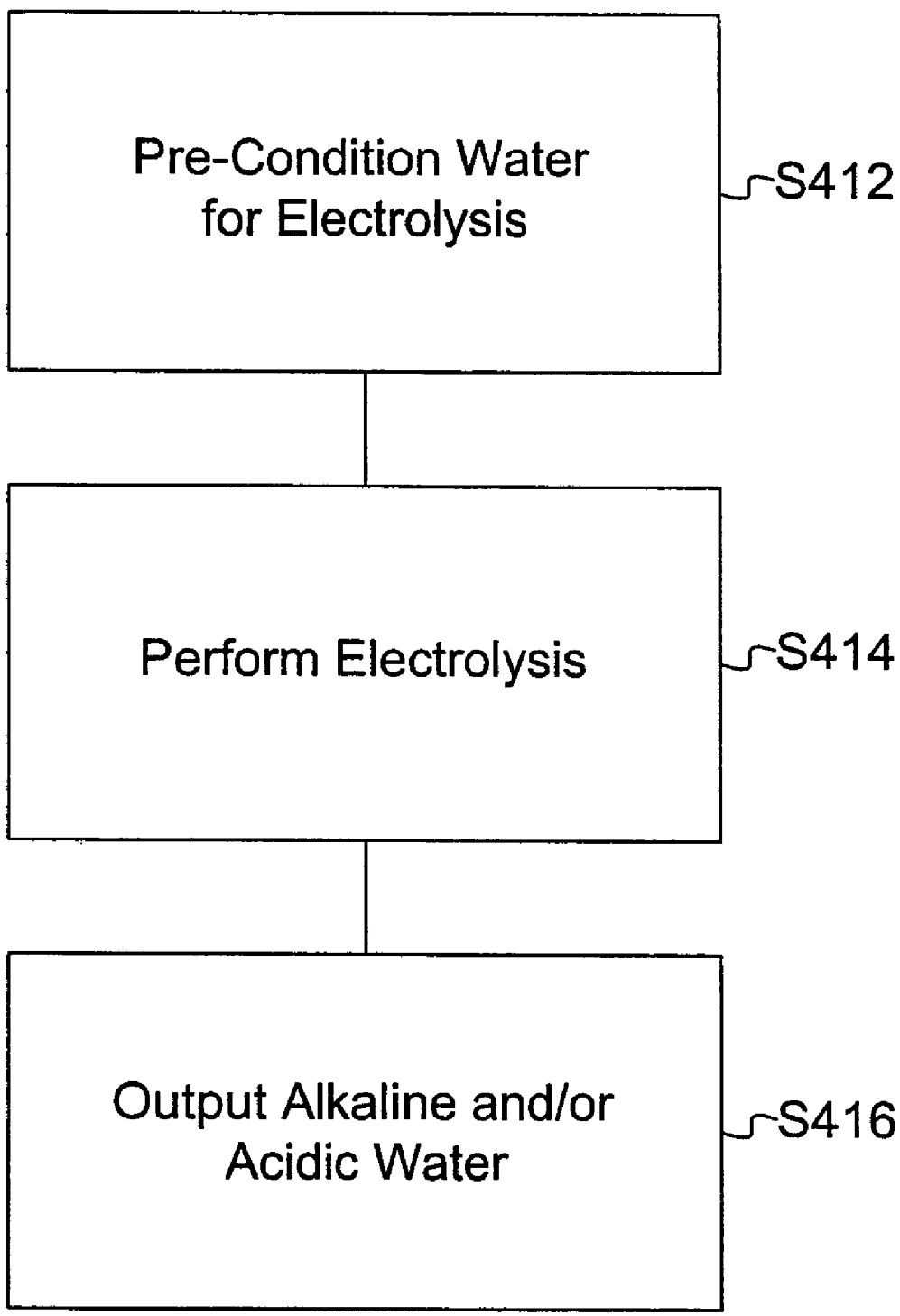
FIG. 2B is a flow chart of a method for preparing water with a stable negative ORP, in accordance with an embodiment of the invention.

FIG. 2B is a flow chart of a method for preparing water with a stable negative ORP, in accordance with one embodiment of the present invention. System 103 for preparing water with a stable negative ORP performs the following steps:

At step S412, water is preconditioned for electrolysis, and at step S414 electrolysis is performed before outputting alkaline and/or acidic water at step S416. Water preconditioning System 100 performs step S412 and electrolysis machine 101 performs step S414. At step S412, System 103 outputs alkaline water to holding tank 109 via pipe 105 and acidic water to acid water tank 110 via pipe 107. Step S412 for preconditioning water involves performing steps S402, S404, S406, S408, and S410, discussed below in connection with FIG. 2D.

Figure 2C:
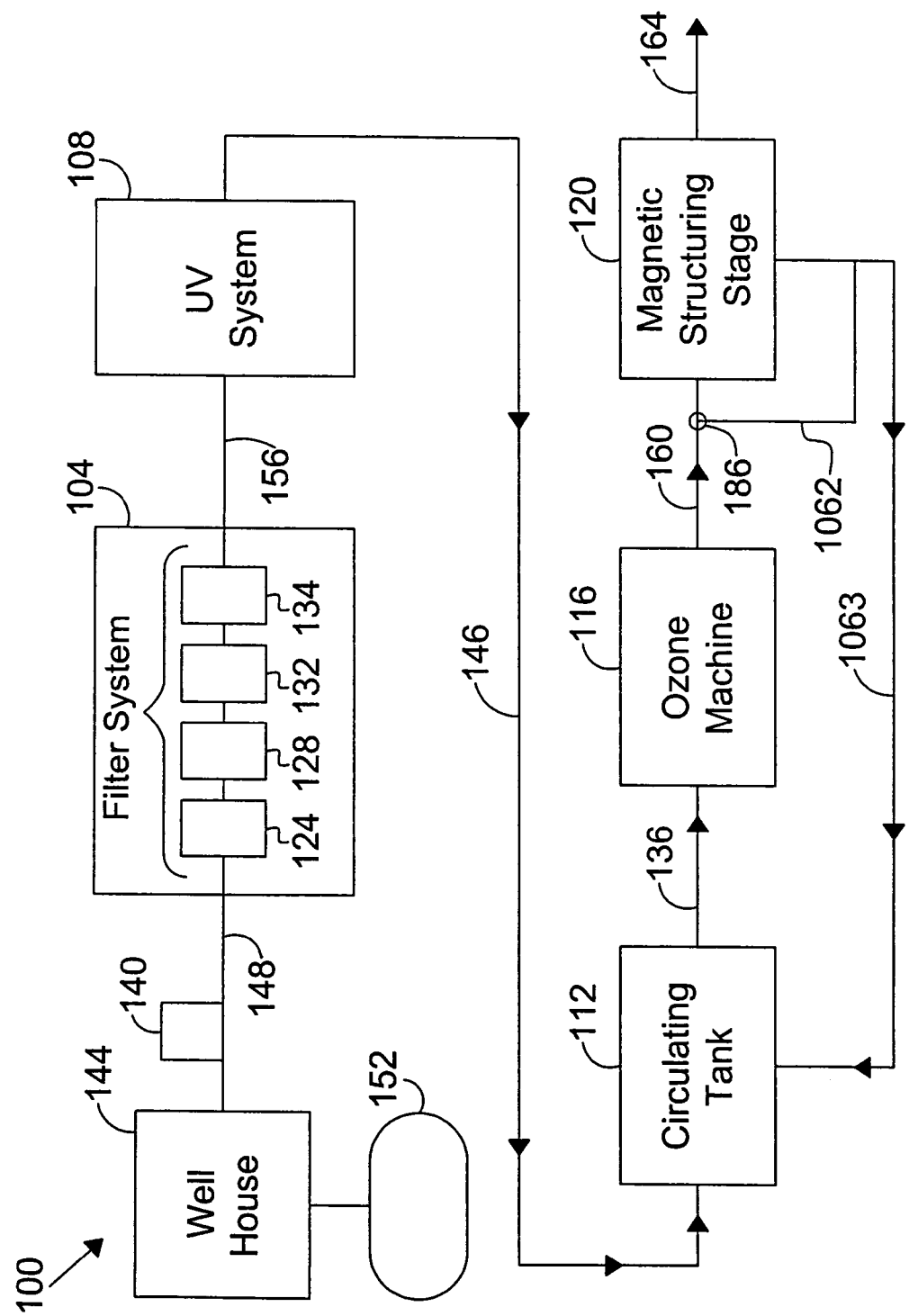
FIG. 2C is a block diagram of a water preconditioning system, in accordance with an embodiment of the invention.

FIG. 2C shows a water preconditioning System 100 for conditioning water for electrolysis, according to one embodiment of the present invention. Water preconditioning System 100 includes a filter system 104, a UV system 108, a circulating tank 112, an ozone machine 116, and a magnetic structuring stage 120.

System 100 for preconditioning water operates generally as follows. First, high quality water is received by filter system 104. High quality water may be water received from water source 152, for example, an aquafier well, preferably an aquafier well located in certain geographic areas throughout the world, such as northern New Mexico and, more specifically, New Mexico, Missouri and Hawaii.

For example, a pump 140, such as a pressure pump, can be used to pump the water from a well house 144 to filter System 104 via a pipe 148. The aquafier well 152 may be deep, for example, ~850 feet deep.

Water received by filter System 104 via pipe 148 is then filtered by filter System 104 and output via a pipe 156 to UV system 108. Water output from UV System 108 via pipe 146 is then input to circulating tank 112, which in turn is coupled via a pipe 136 to an ozone machine 116. Pipe 1063 is provided to allow water to circulate between the circulating tank 112, the ozone machine 116 and the magnetic structuring stage 120.

The ozone machine 116 is selectively activatable. A valve 186 and bypass pipe 1062 are provided for selective bypass of the magnetic structuring stage 120. After passing through magnetic structuring stage 120, preconditioned water may be output via a pipe 164.

Filter System 104 may be, for example, a four-stage filtering system which includes a ~10 μm filter 124, followed by a ~5 μm filter 128, followed by a ~0.5 μm filter 132, followed by a carbon filter 134.

UV System 108 preferably includes a UV chamber carbon block filter (10" 0.5 micron), and a UV #10 lamp (120V, 0.420 amp unit).

Figure 2D:
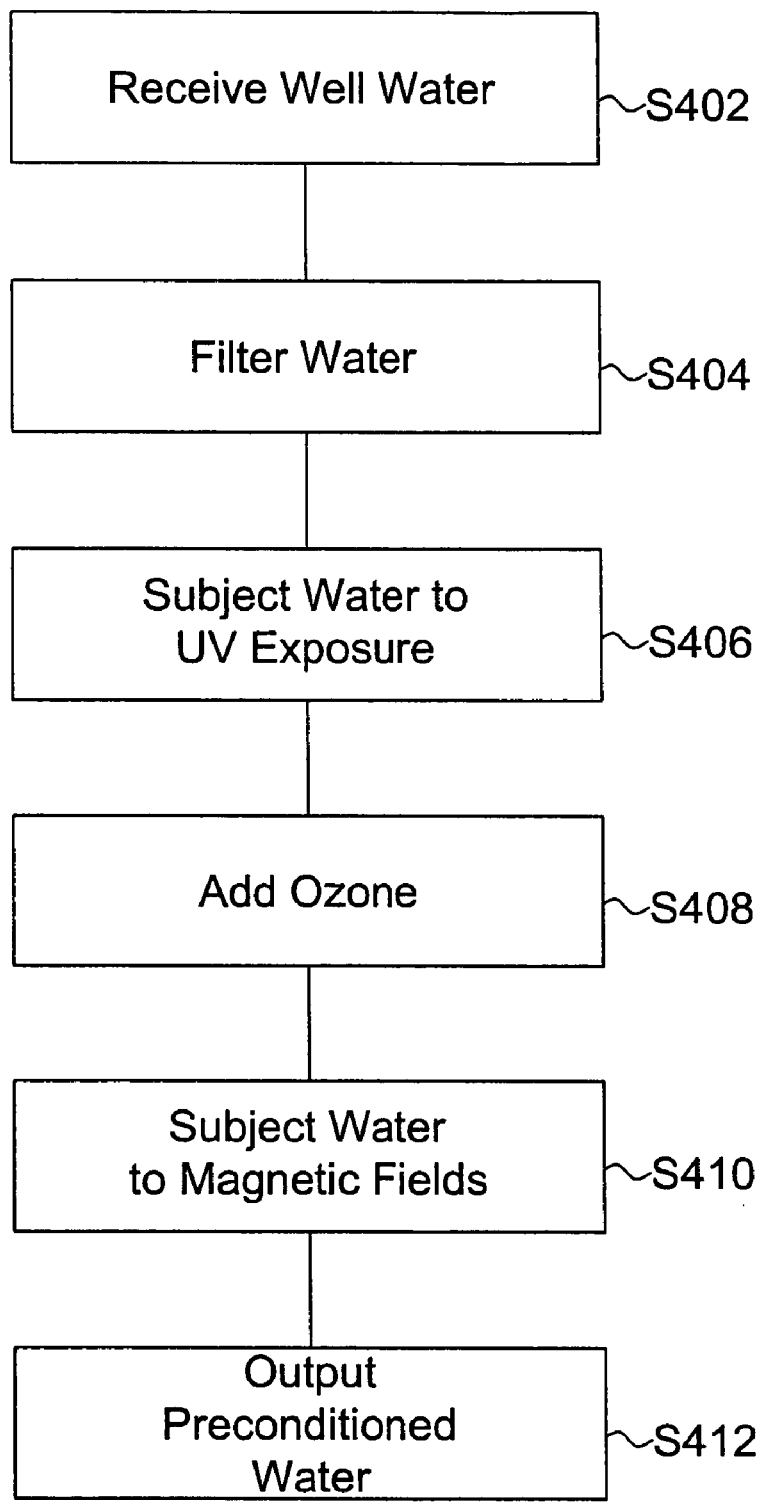
FIG. 2D is a flow chart of a method for preconditioning water, in accordance with an embodiment of the invention.

The operation of System 100 will be explained with reference to FIG. 2D, which is a flow chart of a method for preconditioning water. Water from water source 152 is received by System 100 for preconditioning water at step S402. The water is filtered by filtering System 104 at step S404. Step S406 involves subjecting the water to ultraviolet radiation with UV system 108. Steps S408–S410 involve circulating water between circulating tank 112, ozone machine 116 to add ozone to the water, and magnetic structuring stage 120 to preferably subject the water to a series of magnetic fields. Ozone machine 116 can be set between 1 mm/liter 10 SCFH and 1.2 mm/liter 15 SCFH, and the water is preferably exposed to ozone less than ~15 seconds per ~100 gallons to prevent burning, more preferably approximately between ~two and 10 seconds per ~100 gallons, and most preferably ~5–8 seconds per 100 gallons. Step S412 involves outputting water from magnetic structuring stage 120 as preconditioned water, which can then be input to electrolysis machine 101. A residual of 0.1–0.4 PPM of ozone is typically left in the treated water.

As discussed above, circulating tank 112 is coupled via pipe 136 to ozone machine 116, which is in turn coupled to magnetic structuring stage 120 via pipe 160. Pipe 1063 connects magnetic structuring stage 120 to circulating tank 112 to form a complete circulation loop.

As discussed above, ozone machine 116 is preferably operated for ~5–8 seconds for every ~100 gallons contained in circulating tank 112. However, ozone machine 116 may operate for up to ~15 seconds for every ~100 gallons in circulating tank 112. However, operation should not exceed ~15 seconds for every ~100 gallons of water in circulating tank 112 in order to prevent burning. This essentially saturates and shocks the water. Typical ozone machine operations are between ~0.08 to ~0.8 mm per liter, which is not sufficient to saturate/shock the water. Exceeding ~15 mm per liter results in essentially "burning" the water as mentioned above, so that the water tastes as if it were boiled. Burned water has an unnatural taste and, when one drinks it, is so caustic that it can strip out saliva from the mouth. It has utility in that it can "clear out" one's pipes and has very powerful antibacterial effect in that it can strip bacteria out that most people have a difficult time ridding from their system. For example, iron bacteria in domestic wells is a significant problem. Many believe that the only way to kill them is with excessive chlorine, but that really does not do a complete job. With this system, ~12 seconds per 100 gallons of ozonated water kills iron bacteria.

Figure 3A:
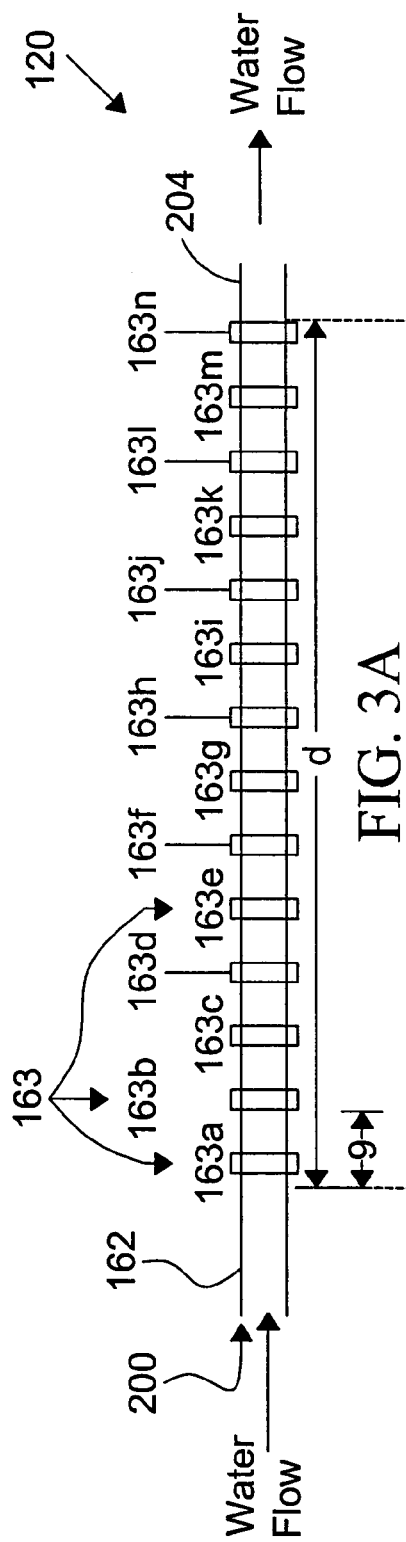
FIG. 3A is a schematic side view of a magnetic structuring stage for a water preconditioning system, in accordance with an embodiment of the invention.

Magnetic structuring stage 120 is shown in FIG. 3A. Water flows from pipe 160 into pipe 162 at location 200 and flows out at location 204. Pipe 162 includes a series of magnetic donut rings 163. According to a preferred embodiment of the invention, other magnet shapes might include north pole bar magnets or other magnets. In this embodiment, there are preferably 14 such donut rings 163a–163n evenly spaced over a distance "d" of approximately 7 feet, such that their central longitudinal axis are spaced apart a distance "a" of ~6.46". Donut ring 163a preferably has a magnetic field strength of ~350 Gauss, while the magnetic field strength of donut ring 163b linearly increases by a difference of ~91.66 Gauss to ~441 Gauss. Further, the magnetic field strength of each subsequent donut ring preferably increases by the same amount linearly until it reaches a maximum value of ~900 Gauss. The magnetic field strength of donut rings 163g and 163h are both preferably ~900 Gauss. The remaining magnets 163i through 163n preferably have magnetic field strengths or flux that are also linearly decreased by ~91 Gauss.

Figure 3B:
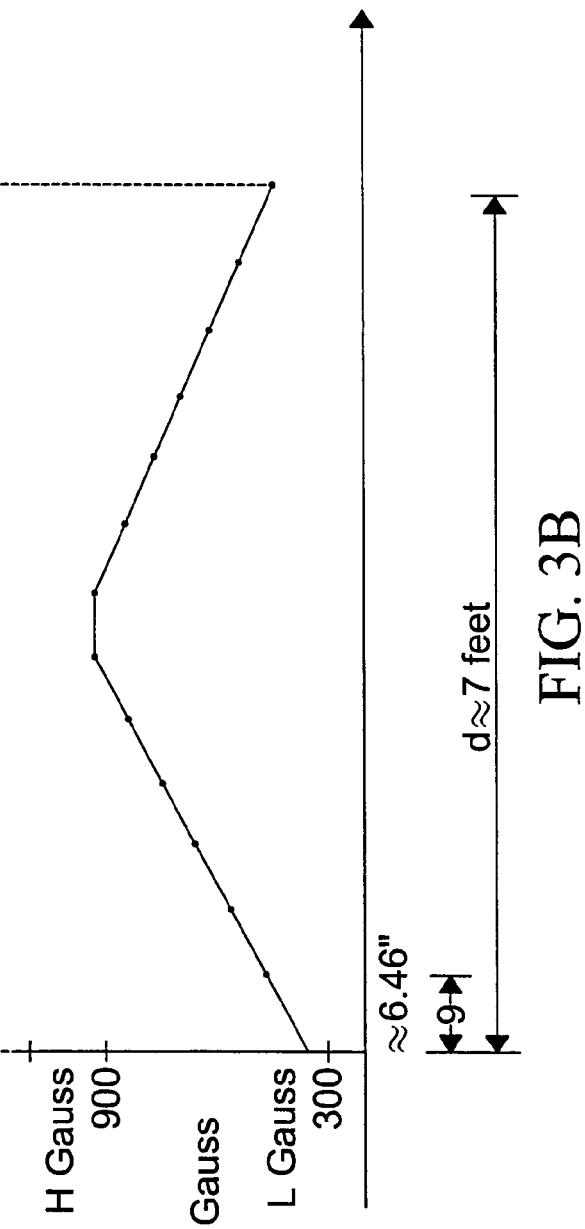
FIG. 3B is a graph of magnetic field strength versus location for donut rings of a magnetic structuring stage, in accordance with an embodiment of the invention.

FIG. 3B is a graph showing the magnetic flux of the magnetic donut rings of an exemplary magnetic structuring stage plotted versus distance or position of the donut rings. In FIG. 3B, the lowest value "LGauss" of magnetic flux for a donut ring is ~350 Gauss, while the highest value "HGauss" of magnetic flux is ~900 Gauss. However, HGauss value can be varied, for example to ~1200 Gauss. When HGauss is ~1200 Gauss, the water can become too clarifying to the colon. In another embodiment of the invention, HGauss can be varied as high as ~1800 Gauss. The value of HGauss depends on the flow rate of the water through pipe 162. As HGauss is increased, the maximum flow rate is preferably decreased. If the flow rate is too slow, the water breaks down.

The purpose of magnetic structuring stage 120 is to structure the water as it passes through the series of magnets 163. The number and shape of magnets 163 can be varied. The flow rate is controlled by the pressure of the water entering location 200 of pipe 162, which pressure can vary anywhere from ~22 psi up to ~30 psi. At ~31 psi, there is a break over point. Water output at location 204 is considered structured water. When HGauss is ~1200 Gauss, the water can hold more oxygen. The flow rate of the water preferably increases as the value of HGauss is increased in order to maintain equilibrium pressure/gauss.

Figure 4A:
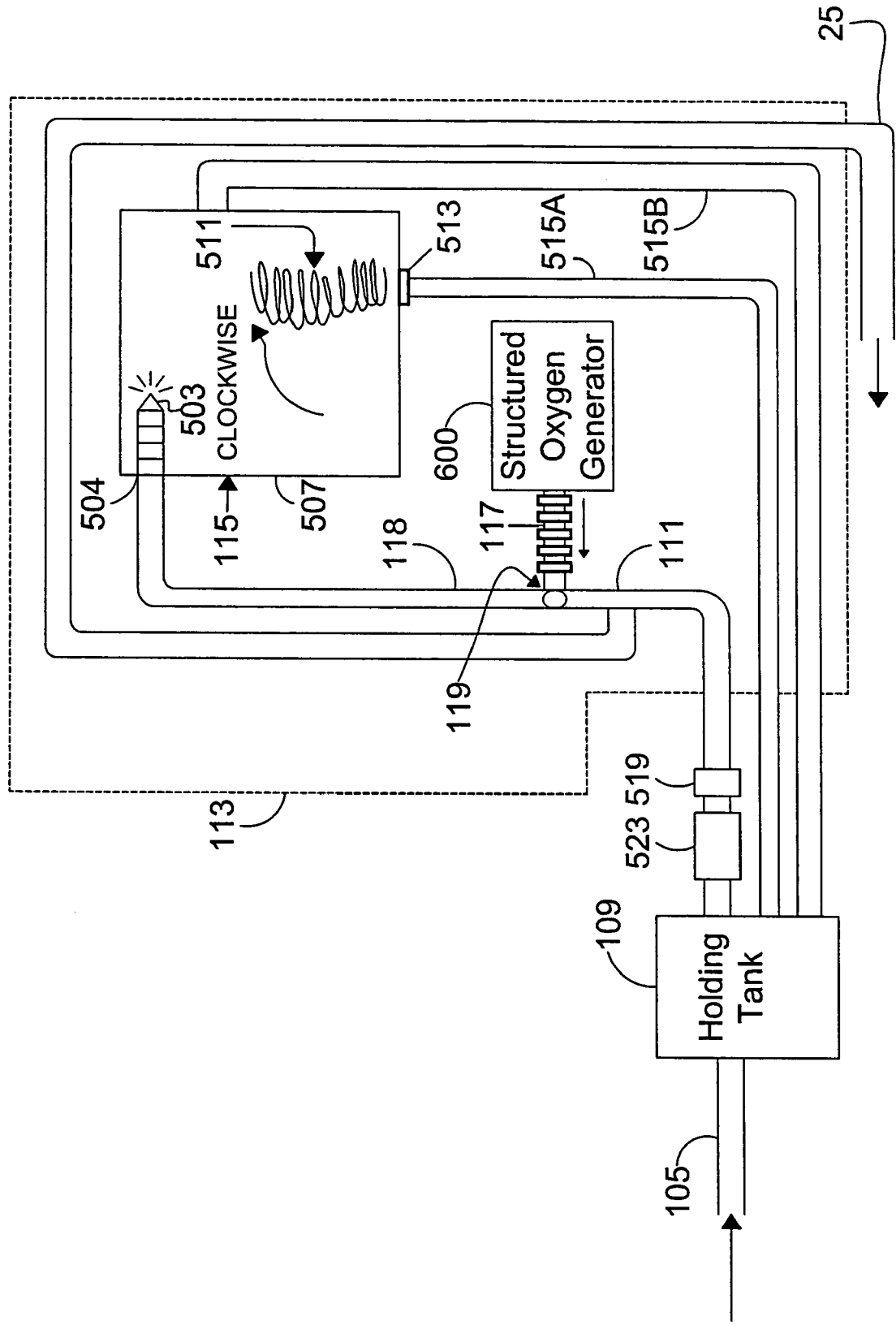
FIG. 4A is a block diagram of an oxygen/water combining system, in accordance with an embodiment of the invention.

FIG. 4A is a block diagram of an oxygen/water combining system, according to one embodiment of the present invention. Ozone treated alkaline water input to holding tank 109 via pipe 105 is then output from holding tank 109 to oxygen/water combining System 113 via pipe 111. A pump 523 and pressure gauge 519 are preferably provided on pipe 111 to control water flow.

Oxygen/water combining System 113 includes a structured oxygen generator 600, which outputs structured oxygen via pipe 117, which is combined and coupled to pipe 111 at valve 119. The ozone treated alkaline water is mixed with the structured oxygen from pipe 117 at valve 119, and both are then directed via pipe 118 to diffusion chamber 115.

Structured oxygen generating machine 600 outputs high pressure oxygen at pipe 117. For example, structured oxygen generating machine 600 may output structured oxygen at up to ~300 PSI changing pressures change electron ring formulation in molecule via pipe 117 before combining with the ozone treated alkaline water in pipe 111. Pipe 111 may be, for example, an ~1 inch pipe.

The combination of water and oxygen in pipe 118 is then sprayed into the diffusion chamber 115 via a pipe 504 in fluid communication with a spray nozzle 503. The spray nozzle 503 has a very small orifice, for example, less than ~0.1 inches and preferably less than ~0.01 inches and more preferably ~0.0078 inches in diameter.

Diffusion chamber 115 includes a cylinder 507 capable of generating a type of tornado or vortex 511 in diffusion chamber 115. Diffusion chamber 115 may be, for example, a modified water filter rated to 250 psi with the top of the water filter replaced with a small set of fittings, for example, ~3/8 inch brass fittings, that go through a ~1 inch orifice, where a pipe for the water filter would normally be located. At the end of pipe 504 is spray nozzle 503. Spray nozzle 503 may be ~1/4 inch in diameter and preferably has a spray fan which is designed to have a spray fan angle that creates a strong vortex of the oxygen-water combination in chamber 115. The resulting spray fan angle is preferably ~15°. The oxygen-water combination at the input of pipe 504 is preferably under a pressure of ~60 PSI.

The tornado 511 is essentially a clockwise vortex that is created in cylinder 507. The tornado 511 has a cream-like appearance due to the fine oxygen bubbles. That is, the tornado 511 is essentially white because all of the oxygen is pulled into the center of the vortex. The width of the tornado or vortex 511 is preferably ~3/4 inch and extends all the way to the bottom of the preferably 18" to 24" cylinder 507. At the bottom of cylinder 507 is a pressure escape valve 513 which is coupled to a pipe 515A which, in a preferred embodiment, is ~1/2 inch in diameter. The pipe 515A which is coupled to holding tank 109. Pipe 515B also couples diffusion chamber 115 to holding tank 109. Pipe 25 connects oxygen/water combining system 113 to cone system 121, with a pressure gauge 25A and cut off valve 25B (See FIG. 1A) provided on pipe 25 to control water flow. Pressure escape valve 513 and pipe 515A provide pressure relief for the system.

Oxygen is mixed with water at location 119. It is desirable to saturate the water with oxygen so that there is an abundance of oxygen. Because there is a saturation of oxygen, it can actually add oxygen to the water rather than pull oxygen out of the water.

Figure 4B:
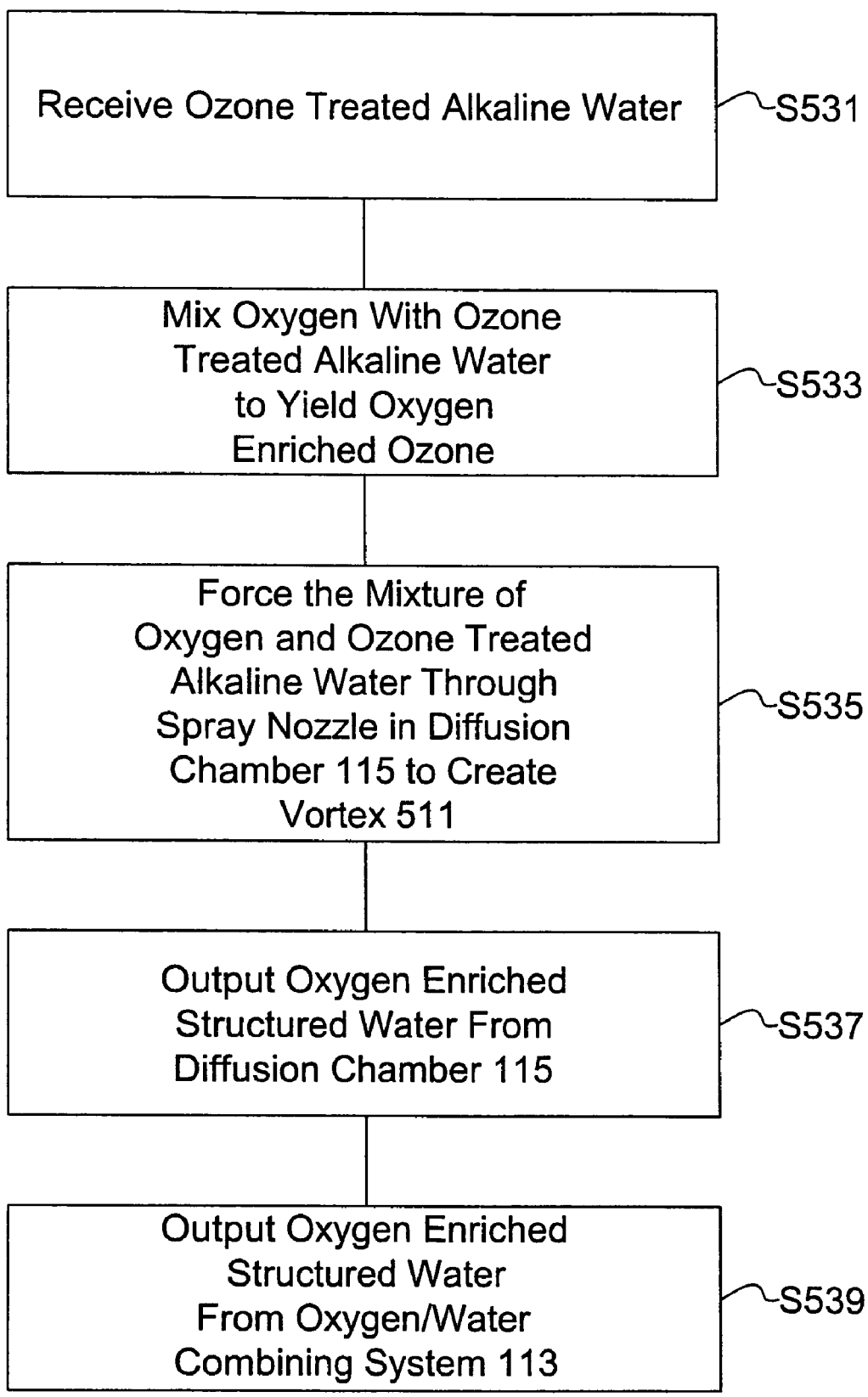
FIG. 4B is a flow chart of an oxygen/water combining method, in accordance with an embodiment of the invention.

FIG. 4B is a flow chart of an oxygen/water combining method, according to one embodiment of the present invention, performed by the oxygen/water combining system 113. Step S531 involves receiving ozone treated alkaline water via pipe 111. Step S533 involves mixing oxygen with ozone treated alkaline water at valve 119. Step S535 involves forcing the mixture of oxygen and ozone treated alkaline water through spray nozzle 503 in diffusion chamber 115 to create tornado/vortex 511. Step S537 involves outputting oxygen enriched structured water from diffusion chamber 115. Step S539 involves outputting the oxygen enriched structured water from oxygen/water combining System 113 via pipe 25.

Figure 5A:
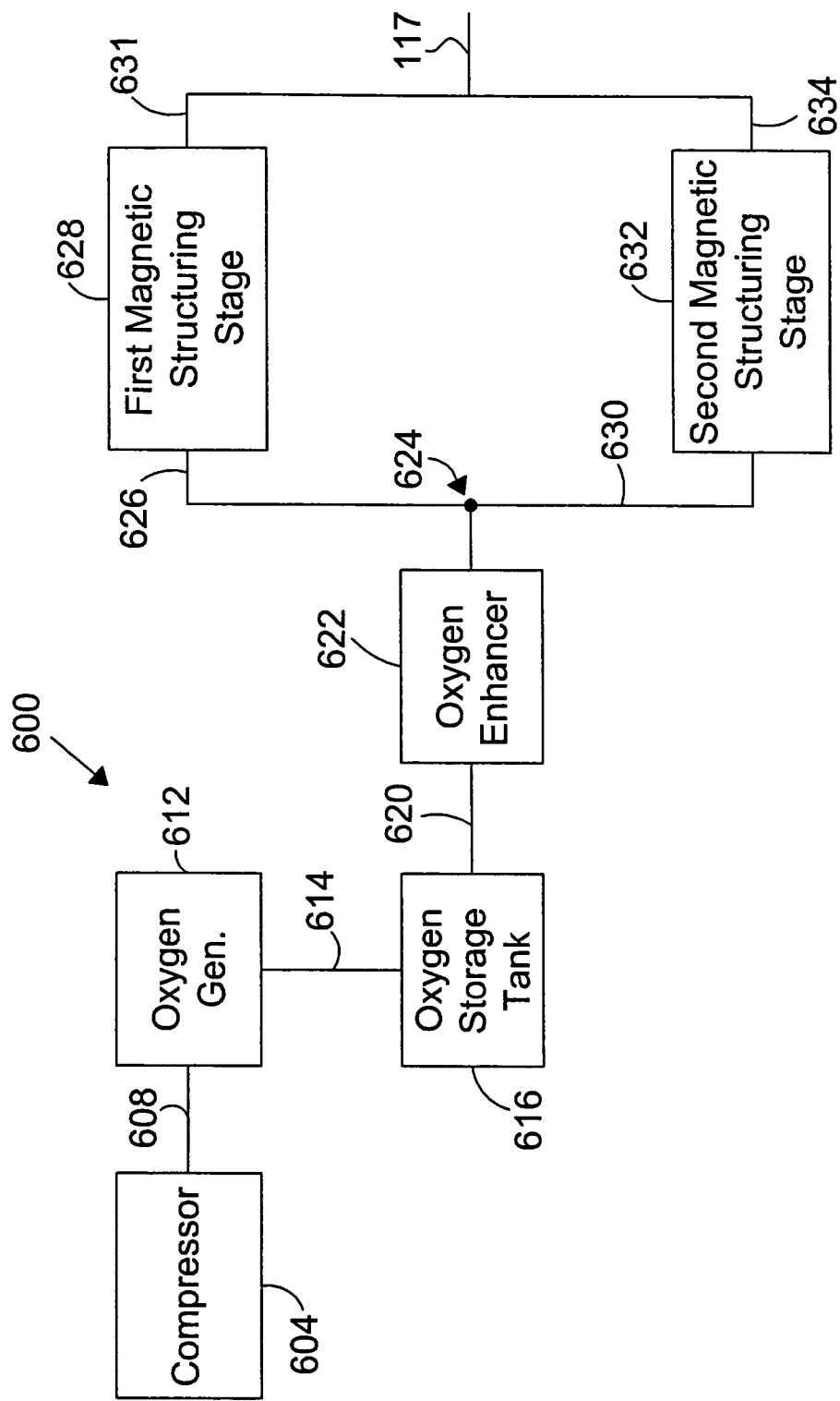
FIG. 5A is a block diagram of a structured oxygen generating machine, in accordance with an embodiment of the invention.

FIG. 5A is a block diagram of a structured oxygen generating machine 600 according to one embodiment of the present invention. Structured oxygen generating machine 600 includes a compressor 604, which is coupled via a pipe 608 to an oxygen generator 612. Compressor 604 may be, for example, a ~25 horsepower compressor which outputs refrigerated and cleaned air at ~250 PSI to oxygen generator 612. Oxygen generator 612 may be, for example, an OGS oxygen generator. Oxygen generator 612 outputs oxygen via a pipe 614 at, for example, ~70 PSI to an oxygen storage tank 616. Oxygen storage tank 616 in turn outputs oxygen at high pressure (up to ~300 PSI) through a high pressure pipe 620 to an oxygen enhancer 622. The oxygen is then directed to a valve 624, which in turn directs the oxygen through either a first magnetic structuring stage 628 or a second magnetic structuring stage 632. When valve 624 is in a first position, oxygen output from oxygen enhancer 622 passes through pipe 626 to first magnetic structuring stage 628, shown in more detail in FIG. 6A. That is, oxygen from oxygen enhancer 622 is input to first magnetic structuring stage 628 via pipe 626 and, after passing through first magnetic structuring stage 628, is output through pipe 631 to pipe 117 as structured oxygen. When valve 624 is in a second position, oxygen from oxygen enhancer 622 passes through pipe 630 to the second magnetic structuring stage 632, shown in more detail in FIG. 6B. That is, oxygen from oxygen enhancer 622 is input to second magnetic structuring stage 632 via pipe 630 and is output via pipe 634 to pipe 117 as structured oxygen.

Figure 5B:
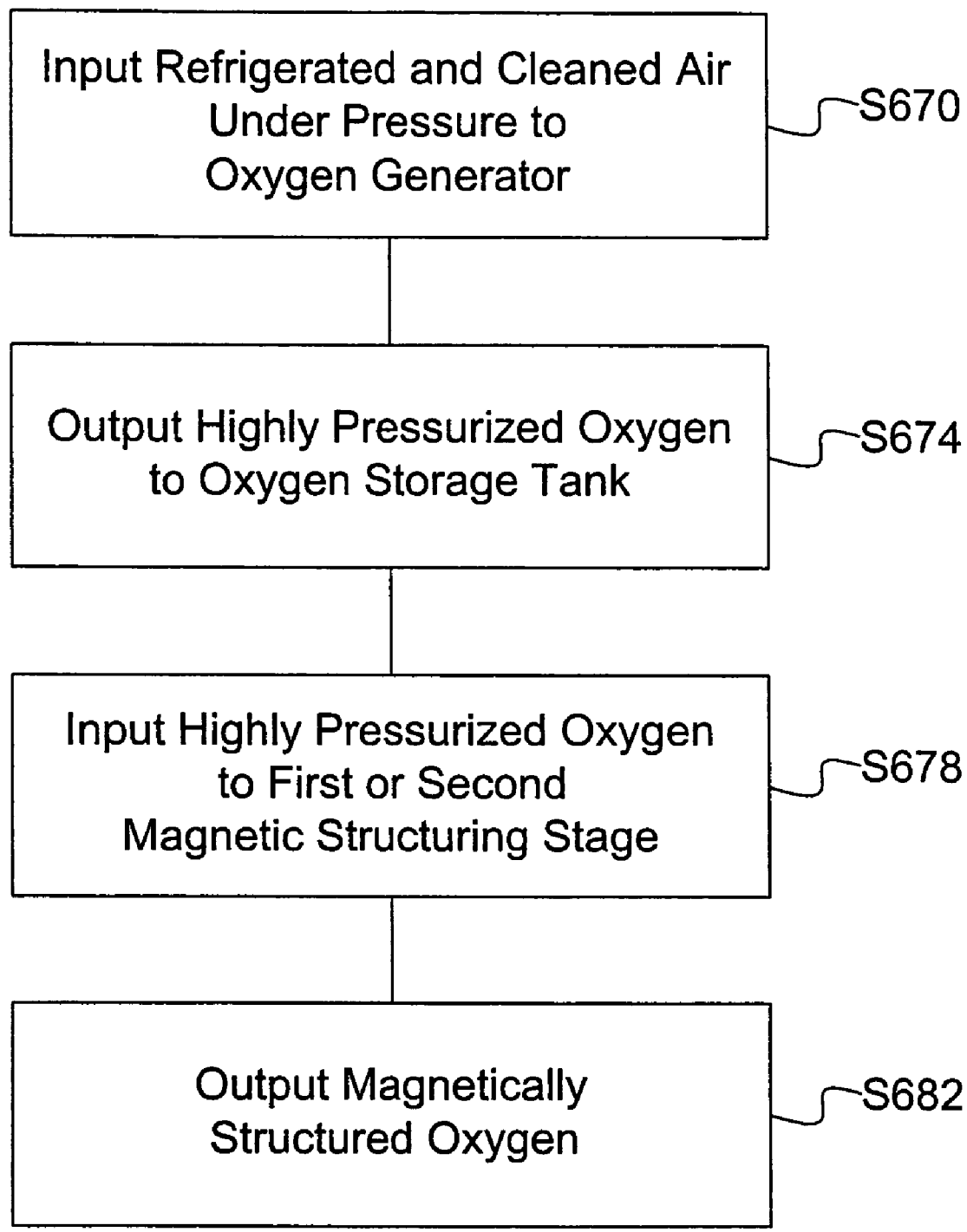
FIG. 5B is a flow chart of a method for producing structured oxygen, in accordance with an embodiment of the invention.

FIG. 5B is a flow chart of a method for producing structured oxygen, according to one embodiment of the present invention. At step S670, refrigerated and cleaned air is input to the oxygen generator 612 under pressure. Oxygen generator 612, in turn, outputs highly pressurized oxygen to oxygen storage tank 616 via pipe 614 at step S674. At step S678, highly pressurized oxygen is input to either first magnetic structuring stage 628 or second magnetic structuring stage 632. At step S682, magnetically structured oxygen is output from either the first magnetic structuring stage 628 or the second magnetic structuring stage 632.

Figure 5C:
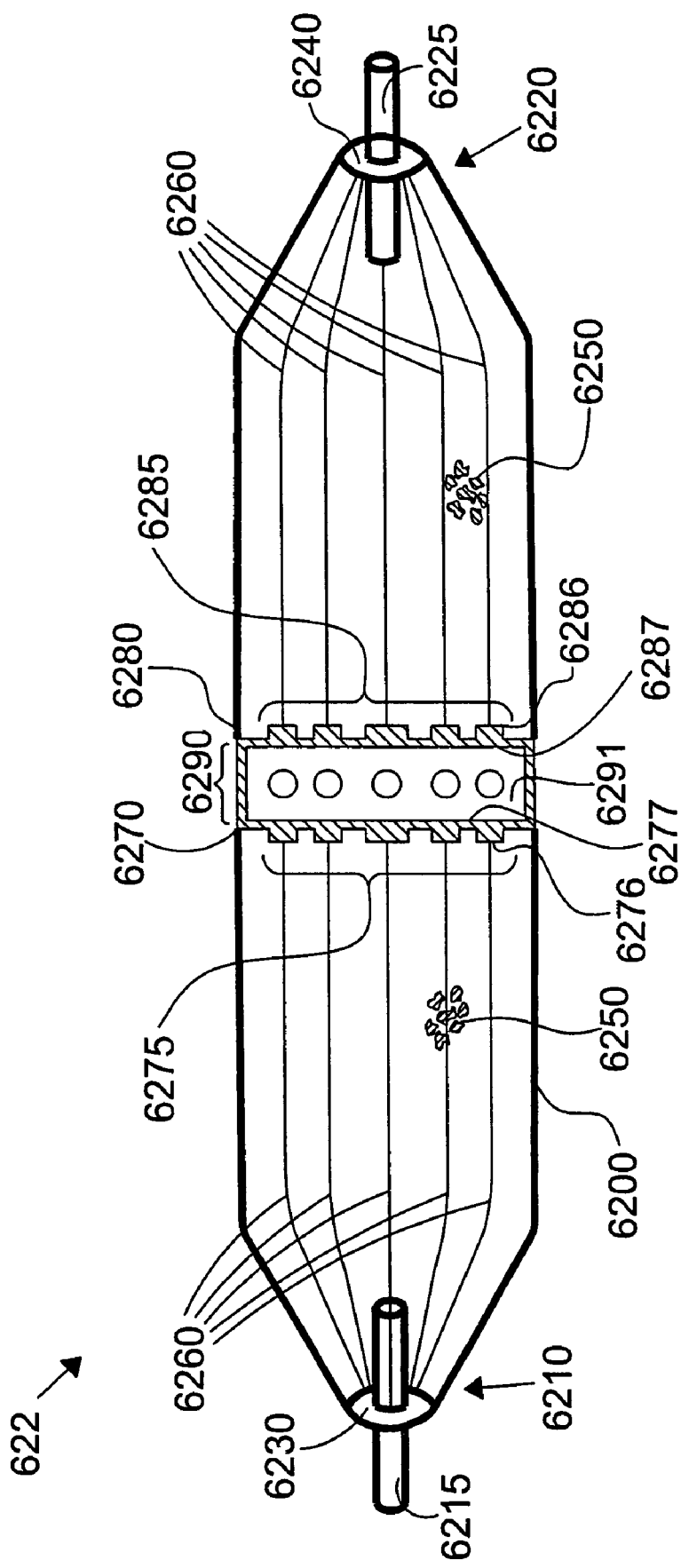
FIG. 5C is a perspective/cross sectional view of the oxygen enhancer shown in FIG. 4A, in accordance with an embodiment of the invention.

FIG. 5C is a longitudinal cross sectional view of the oxygen enhancer 622 shown in FIG. 5A. The oxygen enhancer 622 preferably has a substantially tubular body portion 6200, and is preferably formed of a non-conductive material, such as, for example, high pressure plastic. In one embodiment of the present invention, the body portion 6200 may be between 14 and 17 inches long, and approximately 3 inches in diameter. However, other dimensions for the body portion 6200 may also be used. Ends of the body portion 6200 are preferably tapered so as to form an inlet 6210 and an outlet 6220, which accommodate incoming and outgoing pipes 6215 and 6225, respectively. In one embodiment of the present invention, the incoming and outgoing pipes 6215 and 6225 preferably have a 1/2 inch diameter, and some length thereof (e.g., 1/2 inch) may extend into the body portion 6200. However, other diameters may also be used.

Ring type devices 6230 and 6240, such as, for example, a washer, are preferably positioned at the inlet 6210 and outlet 6220 to secure and properly align the pipes 6215 and 6225, respectively, in place. The body portion 6200 are preferably filled with a filtering material 6250, such as, for example, carbon, to scrub the oxygen processed therethrough and absorb any contaminants that may be present. The carbon chips 6250 may vary in size, and preferably fall within an average size of between ⅛ and 1/32 inch. Carbon creates a pure, clean oxygen that is readily accepted into the water.

First and second mesh screens 6270 and 6280, respectively, are preferably positioned in the body portion 6200 as shown in FIG. 5C, preferably with a void 6290 formed therebetween. The screens 6270 and 6280 may be made of any type of suitable metallic material, such as silver, platinum or gold. In one embodiment of the present invention, the screens 6270 and 6280 are preferably made of a gold mesh material. However, other materials, such as, for example, copper and brass, could also be used. The mesh size of the screens 6270 and 6280 may also be varied. In one embodiment of the present invention, the mesh size may preferably fall within a range of between 150 and 200 microns, and is most preferably 200 microns.

A plurality of magnets are provided on each of the first and second screens 6270 and 6280, with a first set of magnets 6275 preferably provided on a surface of the first screen 6270 facing the inlet 6210, and a second set of magnets 6285 preferably provided on a surface of the second screen 6280 facing the outlet 6220. Wires 6260, preferably made of a conductive material, such as, for example, copper, extend from the first set of magnets 6275 to the inlet ring 6230, and from the second set of magnets 6285 to the outlet ring 6240. The wires 6260 may be attached to the rings 6230 and 6240 by any suitable means such as, for example, soldering.

Figure 5D:
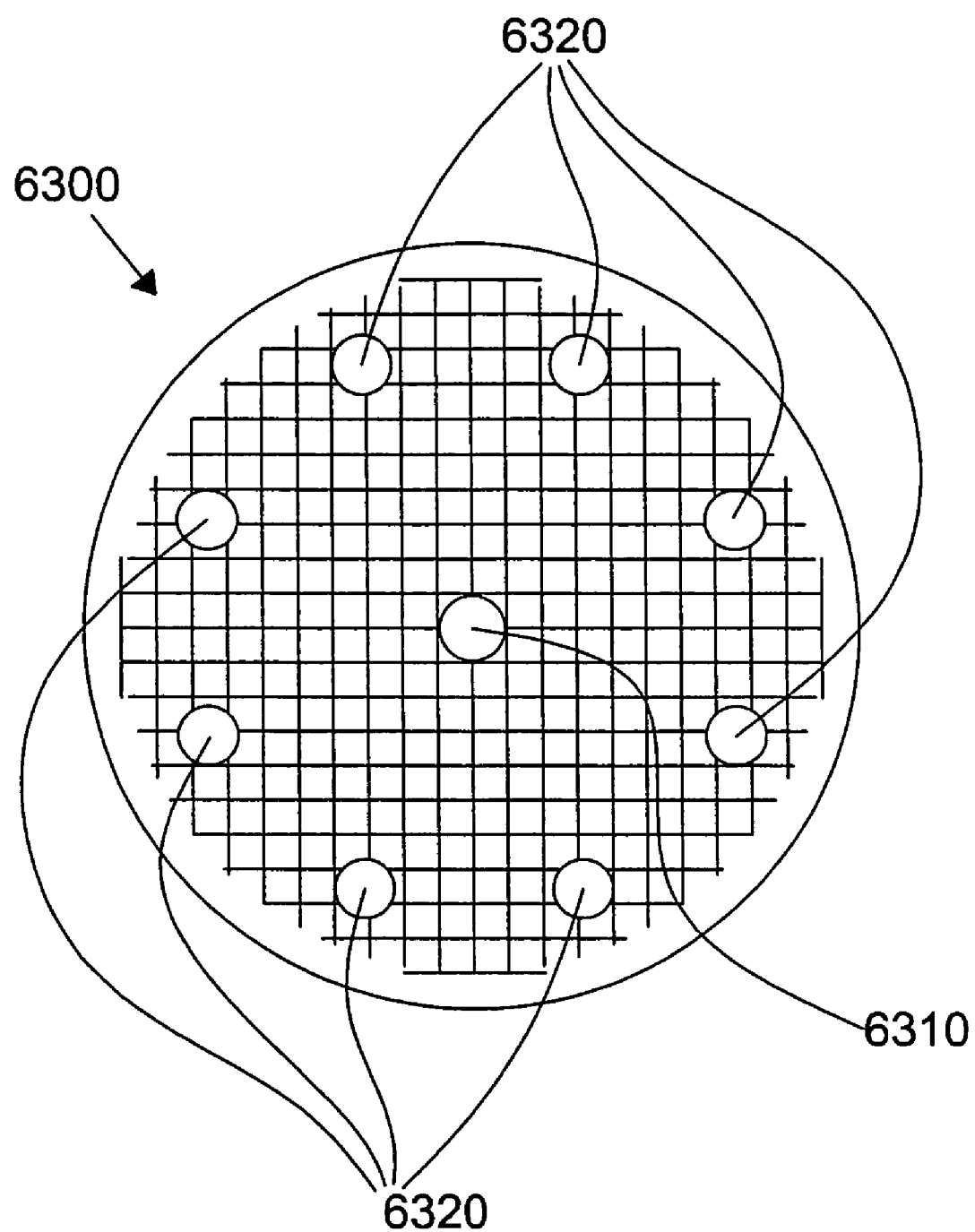
FIG. 5D is a front view of a screen shown in FIG. 5C.

A front view of an exemplary mesh screen 6300 is shown in FIG. 5D. This exemplary mesh screen 6300 is shown with nine magnets attached thereto, with a center magnet 6310 being preferably slightly larger than surrounding magnets 6320. However, other numbers of magnets, relative sizes, strengths, and arrangements on the mesh screen 6300 may also be used. The magnets may be made of any appropriate magnetic material. In one embodiment of the present invention, the magnets are preferably button magnets, and most preferably germanium button magnets, that are less than ½ inch in diameter, and preferably ⅜ inch in diameter, and with a strength of between 300 and 550 Gauss. Based on this type of magnet arrangement on each of the first and second screens 6270 and 6280 shown in FIG. 5C, an appropriate width for the void 6290 is approximately ½ inch. However, the number, arrangement, and strength of the magnets may be varied, and an appropriate width of the void 6290 may be determined based on the resulting strength of the magnetic flux produced by the magnets.

In FIG. 5C, the first set of magnets 6275 is preferably oriented with a north side 6276 facing the inlet 6210, and a south side 6277 adjacent the first screen 6270, while the second set of magnets 6285 is preferably oriented with a north side 6286 facing the outlet 6220, and a south side 6287 adjacent the second screen 6280. This opposing polarity arrangement causes the oxygen to "snap" as it passes through the void 6290, thus initiating the structuring process by aligning and preparing the oxygen for further structuring as it subsequently passes through either the first or second structuring stages 628 or 632.

FIGS. 5E and 5F are front and side views, respectively, of a ring 6291 which is preferably positioned within the void 6290. The ring 6291 preferably includes a plurality of magnets 6292 positioned along a circumference of the ring 6291, adhered to the ring 6291 by any suitable means. In one embodiment of the present invention, fourteen germanium magnets 6292 are preferably adhered along a circumference of the ring 6291 with a silicone based compound. In this embodiment, each of the magnets 6292 may be between ½ and ⅜ inch in diameter, and each have a strength of approximately 200 Gauss. However, it should be understood that many other combinations of type, number, and strength of the magnets may be used to provide a suitable effect. Similarly, a width W of the ring 6291 may be varied based on a corresponding width of the void 6290 formed between the screens 6270 and 6280.

As shown in FIGS. 5E–5G, a south pole S of each of the magnets 6292 is preferably flush with an outer circumference 6293 of the ring 6291, while a north pole N of each of the magnets 6292 preferably extends from an inner circumference 6294 of the ring 6291 and toward the center of the ring 6291. Accordingly, when configured as such and positioned in the void 6290 formed between the screens 6270 and 6280, the south poles S of the magnets 6292 and the outer circumference 6293 of the ring 6291 contacts an inner surface of the body portion 6200, while the left and right faces 6295 and 6296, respectively, of the ring 6291 contact the screens 6270 and 6280, respectively. In one embodiment of the invention, the width W of the ring 6291 is approximately ½ inch to match the corresponding width of the void 6290.

FIG. 6A is a schematic side view of a first magnetic structuring stage for a structured oxygen generating machine, according to one embodiment of the present invention. First magnetic structuring stage 628 includes N donut magnets 1, 2, 3 . . . N all arranged along pipe 626. Each of the donut magnets 1~N preferably has a strength of up to ~3,300 Gauss. The spacing between central longitudinal axes of the donut magnets 1 and 2 of first magnetic structuring stage 628 is preferably ~2 inches, and gradually increases to the middle 636 of first magnetic structuring stage 628 at which point the spacing is preferably ~12 inches, and then the spacing between the subsequent donut magnets decreases until the spacing between central longitudinal axes of donut magnets N−1 and N is preferably ~2 inches. The middle 636 of first magnetic structuring stage 628 is preferably located ~4.5 feet from each end of the first magnetic structuring stage 628.

Alternatively, as discussed above, oxygen can be directed by the valve 624 to the second magnetic structuring stage 632. FIG. 6B is a schematic side view of the second magnetic structure stage for a structured oxygen generating machine, in accordance with one embodiment of the present invention. In this embodiment, there are M central longitudinal axes of donut magnets which are spaced apart distances D1, D2 . . . $D_M$, where distances $D_i$ all represent a Fibonacci sequence in inches. Hence, $D_i$=1, 1, 2, 3, 5, 8, 13, . . . , whereby $D_j=D_{j-2}+D_{j-1}$. In a preferred embodiment, M is an integer between 1 and 21.

The structured oxygen, which is output from either the first magnetic structuring stage 628 or the second magnetic structuring stage 632, may be used to enrich water with oxygen according to processes described herein. When the structured oxygen output from first magnetic structuring stage 628 is mixed with properly prepared water, the resulting water may provide energy to the person or mammal that ingests the water. On the other hand, structured oxygen output from second magnetic structuring stage 632, when used to enrich water, yields oxygen enriched water which may produce a sedating effect for people or mammals that ingest the oxygen enriched water.

Figure 7A:
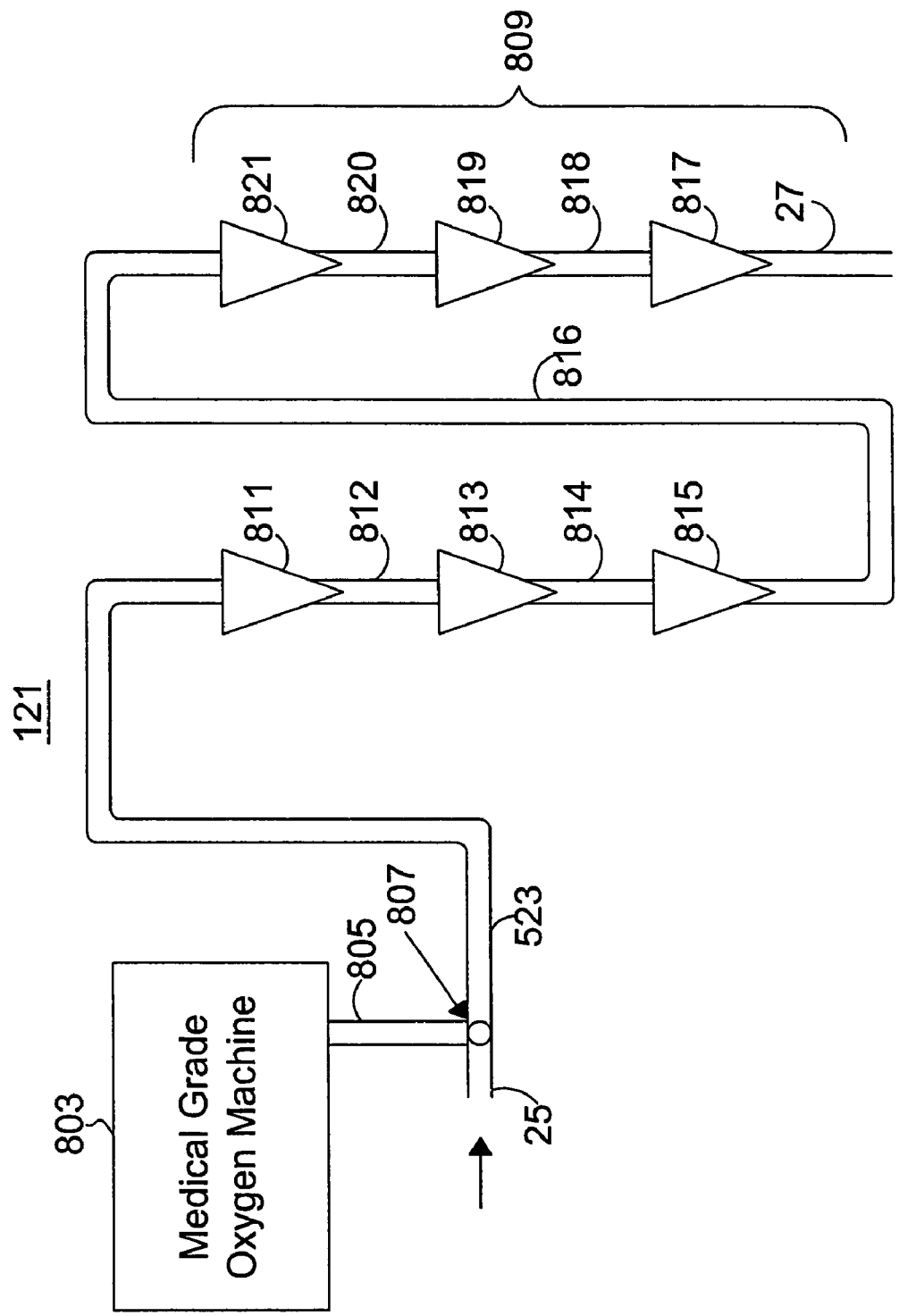
FIG. 7A is a schematic block diagram of a cone system, in accordance with an embodiment of the invention.

FIG. 7A is a block diagram of a cone system, in accordance with one embodiment of the present invention. Combined oxygen/water is input via pipe 25 to cone system 121. A medical grade oxygen machine 803 is coupled to pipe 25 via a pipe 805 at a valve 807. Medical grade oxygen is output from the medical grade oxygen machine 803 and mixed with the combined oxygen/water from the system 10 at valve 807, and together are directed via a pipe 523 to a series of cones 809. The series of cones 809 are shown in FIG. 7A to be 6 cones 811, 813, 815, 817, 819 and 821, according to one embodiment of the present invention. However, the number of cones in the series of cones 809 can vary from 1 to N where N can be as high as 24. The combined water/oxygen from system 10 and the medical grade oxygen 803 are mixed by each of cones 811 through 821, which individually spin the combination, and output a resulting spun water via pipe 27. In this embodiment, cone 811 is coupled to cone 813 by a pipe 812, cone 813 is coupled to cone 815 by a pipe 814, cone 815 is coupled to cone 817 by a pipe 816, cone 817 is coupled to cone 819 by a pipe 818, and cone 819 is coupled to cone 821 by a pipe 820.

Figure 7B:
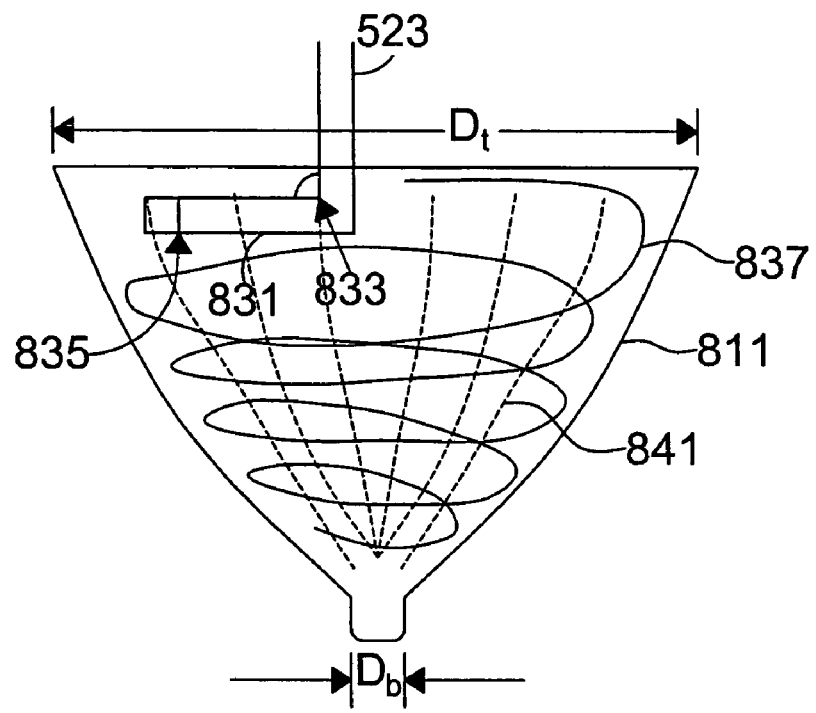
FIG. 7B is a schematic side view of an exemplary cone structure, in accordance with an embodiment of the invention.
Figure 7C:
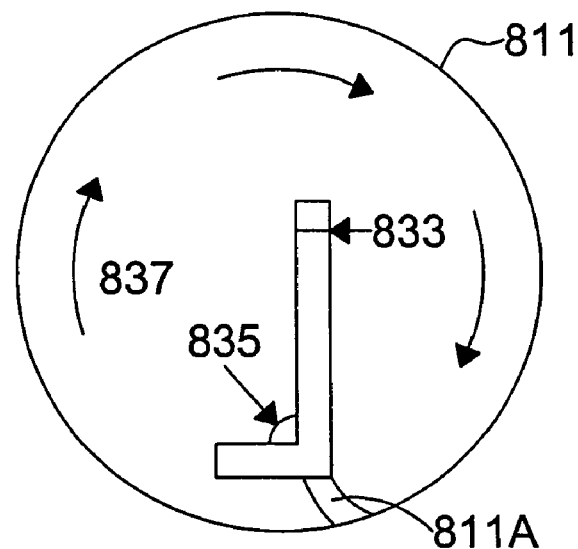
FIG. 7C is a schematic top view of the cone structure of FIG. 7B.

FIG. 7B is a schematic side view of an exemplary cone 811, and FIG. 7C is a schematic top view of the exemplary cone 811. Referring to FIG. 7B, pipe 523 is coupled to a tube 831, for example, a double-bent tube, near the top of cone 811. In this embodiment, tube 831 is preferably a crystal tube. Tube 831 preferably includes two ~90° bends 833 and 835. Bends 833 and 835 are preferably ~90°, but can vary by plus or minus 45°. Also, bends 833 and 835 are preferably configured so as to impart a clockwise spin 837 in cone 811. The combination of oxygen and water input to tube 831 is under high pressure of at least ~30 PSI and more preferably of at least ~34 PSI in order to create clockwise spin 837 in cone 811. Pipe 812 is coupled to cone 813 in the same manner as pipe 523 is coupled to cone 811, and this is also true for cones 813 through 821 as well.

Clockwise spin vortex 837 of the oxygen/water combination will be referred to herein as a clockwise vortex spin 837. The ratio of the oxygen from medical grade oxygen machine 803 and the oxygen/water combination, together with the water pressure at tube 831, determines the efficiency of the mixing of oxygen with water at cone 811, as well as the rest of cones 813–821. Lines 841 in vortex 837 disappear if oxygen from medical grade oxygen machine 803 is turned off. That is, clockwise vortex spin 837 remains but lines 841 disappear.

In the embodiment discussed above, the inner diameter of tube 523 is preferably ~1/4" and the outer diameter is preferably ~1/2", the inner diameter of tube 831 is preferably ~1/8" and the outer diameter is preferably ~1/4". The tube 831 is preferably ~1 3/4" long and preferably extends to a position ~3/8" from the edge of cone 811, and is preferably attached to cone 811 by, for example, a solder joint 811A. Further, cone 811 preferably has a diameter $D_t$ at a top portion of ~6" and a diameter $D_b$ at a bottom portion of ~1/8".

Figure 7D:
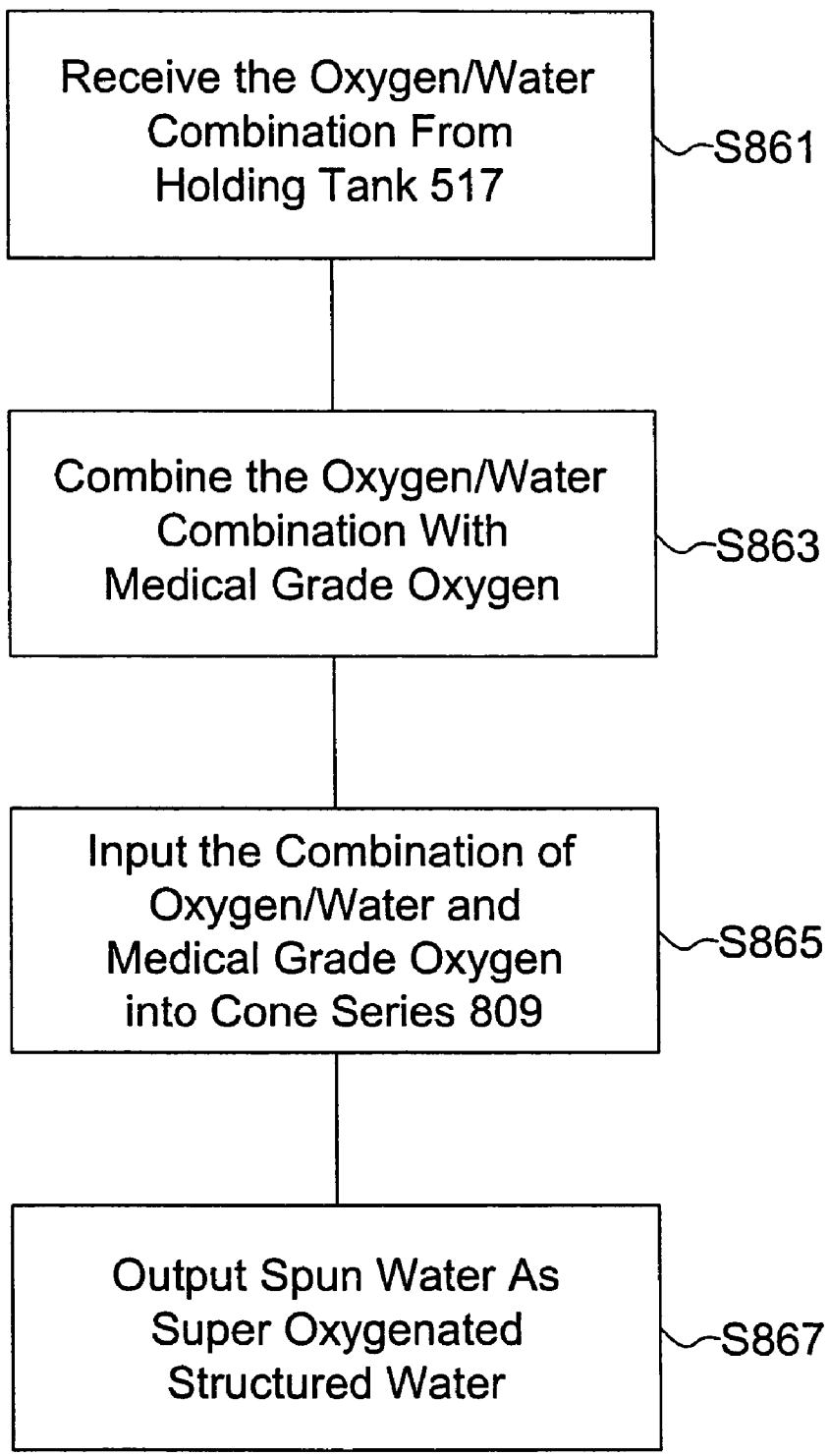
FIG. 7D is a flow chart of a method for spinning oxygen using a cone system, in accordance with an embodiment of the invention.

FIG. 7D is a flow chart of a method for spinning water with oxygen using a cone system, according to one embodiment of the present invention. Step S861 involves receiving the oxygen/water combination. Step S863 involves combining the oxygen/water combination with medical grade oxygen. Step S865 involves inputting the combination of oxygen/water and the medical grade oxygen into cone series 809. Finally, step S867 involves outputting spun water as super-oxygenated and structured water, with its negative ORP further enhanced and locked into the water.

Figure 8A:
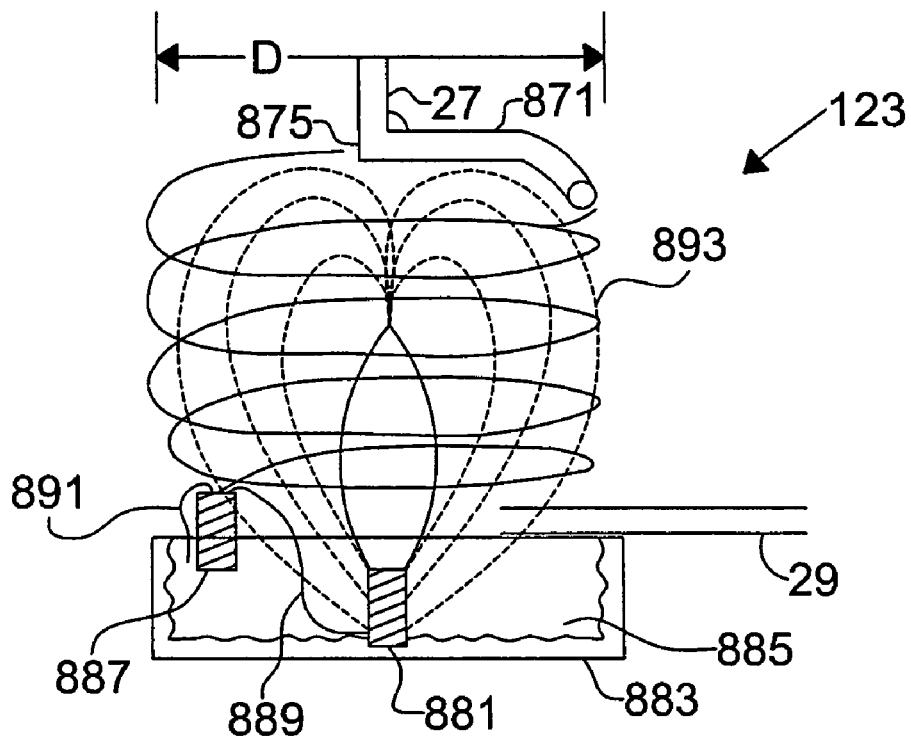
FIG. 8A is a schematic side view of a coil system, in accordance with an embodiment of the invention.
Figure 8B:
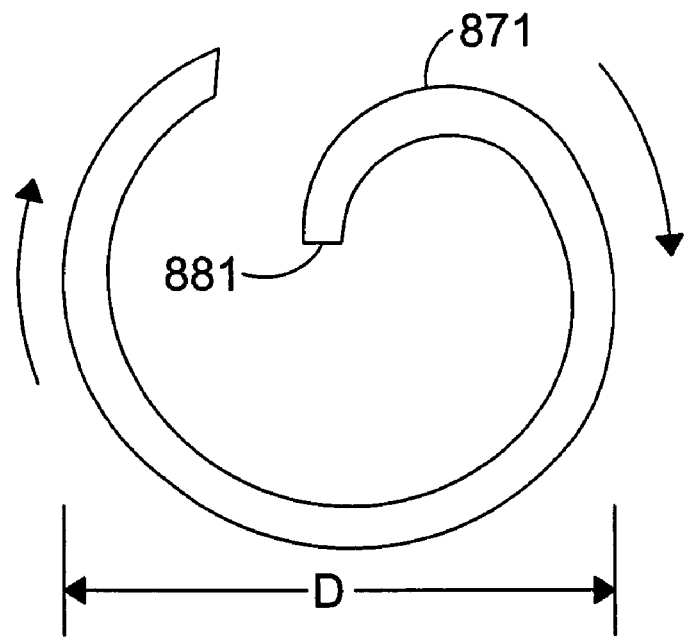
FIG. 8B is a schematic top view of the coil system of FIG. 8A.

FIG. 8A is a schematic side view and FIG. 8B is a schematic top view of a coil system, according to one embodiment of the present invention. Coil System 123 includes a coil 871 with an outer diameter D. In this embodiment, coil 871 is preferably a crystal coil. The outer diameter D of coil 871 can vary from ~4" to ~12", and is preferably between ~5" and ~9", and more preferably ~7 inches. Pipe 27 is coupled to tube 871 to form a bend 875 with an angle between ~45° and ~130° and preferably between ~65° and ~95° and more preferably ~90°. In particular, pipe 27 is coupled to tube 871 to form bend 875 and water flows through pipe 27 until it reaches bend 875 at which point it is abruptly redirected to the right to begin a clockwise flow down tube 871 until it is output at pipe 29, as shown in FIG. 8A.

In this embodiment, tube 871 is preferably cylindrical with a round cross-section. However, other shapes, such as octagonal, hexagonal, or oval, for example, can also be used.

A crystal 881 is preferably arranged approximately in the center of coil 871, as shown in FIG. 8A. The size of crystal 881 is preferably 3" or 12", but is more preferably 7". However, other crystal sizes may be used. The crystal 881 is arranged in a container 883, which may contain a tincture or solution 885. A battery 887 is preferably coupled via a wire 889 to crystal 881 and the other pole of battery 887 is preferably grounded in tincture or solution 885 via a wire 891. As the water travels in a clockwise pattern down coil 871 it cuts through magnetic flux lines 893 created by the battery 887 and crystal 889 combination. The right hand or clockwise flow of the water pulls electrons into its orbit. If coil 871 is reversed, so as to provide a counterclockwise flow or a left hand spin of the water, then the left hand spin throws electrons out of the orbit. The water resulting from a left hand spin is beneficial for a short time because of detoxifying effects in the body. Independent of crystal 881, a motion of the water in either a clockwise or counterclockwise fashion creates an electromagnetic field which can be measured, such as any charged particle in motion would create an electromagnetic field. In this embodiment, crystal 881 is preferably a vogel crystal. Solution 885 may contain herbs or any substance depending on the tint for the water. By placing different substances in solution 885 or by changing solution 885, water output from pipe 29 can be tuned to that particular substance or solution. "Tune" can refer to the modification of the structure, character and/or property of the water.

Crystal 881 oscillates at a particular resonance frequency, which can modify the water. These frequencies can vary from ~5 to ~9 Hz, and preferably from ~6 to ~8 Hz, and more preferably from ~6.8 to ~7.8 Hz, and even more preferably from ~7.2 to ~7.8 Hz.

Figure 8C:
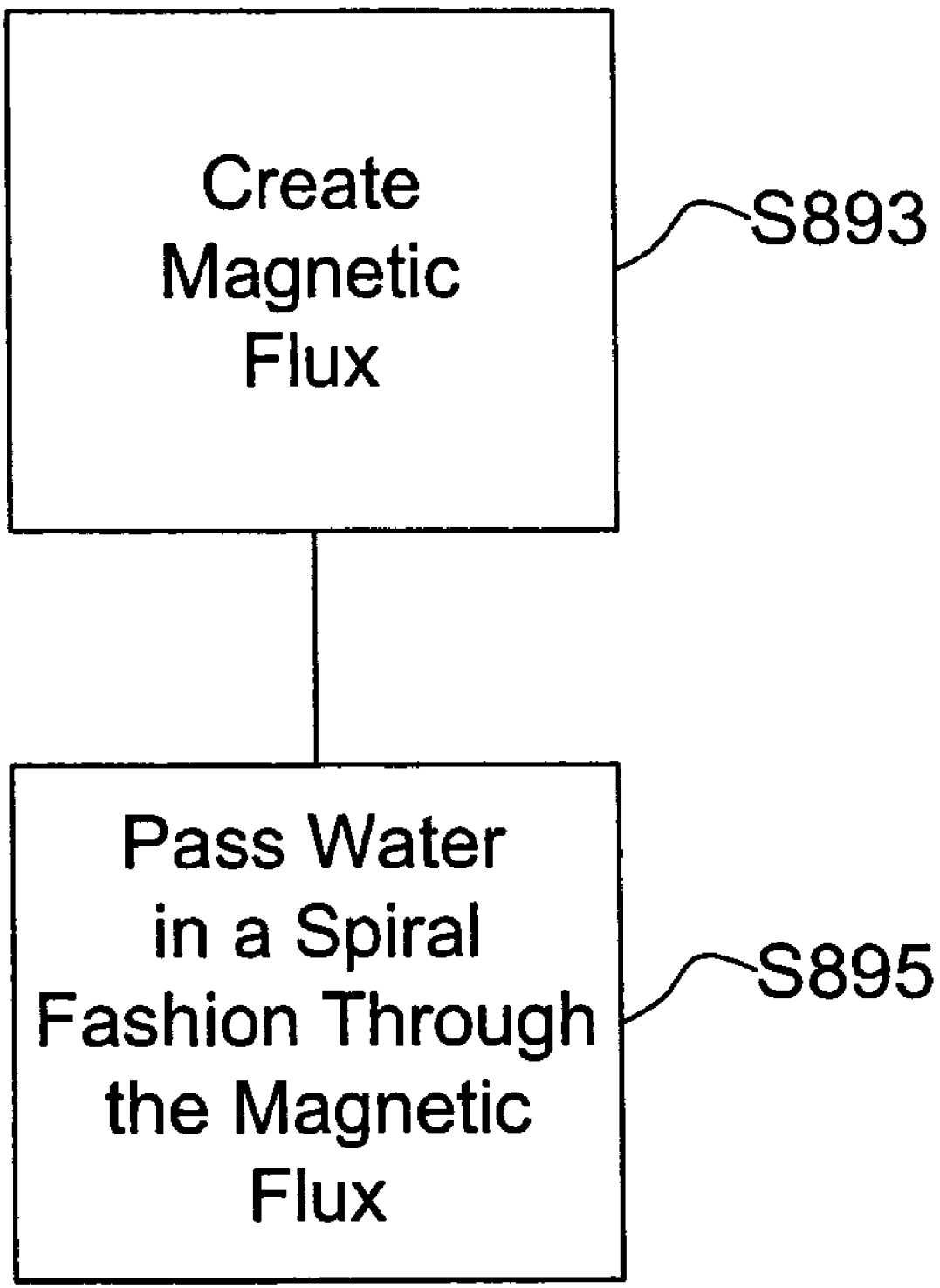
FIG. 8C is a flow chart of a method of using the coil system of FIGS. 8A–8B.

FIG. 8C is a flow chart of a method performed by the coil system of FIGS. 8A–8B. In particular, FIG. 8C shows step S893, which involves creating a magnetic flux, and step S895, which involves passing water in a spiral fashion through the magnetic flux. The magnetic flux is preferably created using a crystal, as discussed with respect to FIG. 8A. Also, as water is passed in a spiral fashion, it can be passed in a clockwise spiral fashion through the magnetic flux in order to maintain free electrons in the water or in a counterclockwise fashion in order to give off electrons from the water.

Figure 9A:
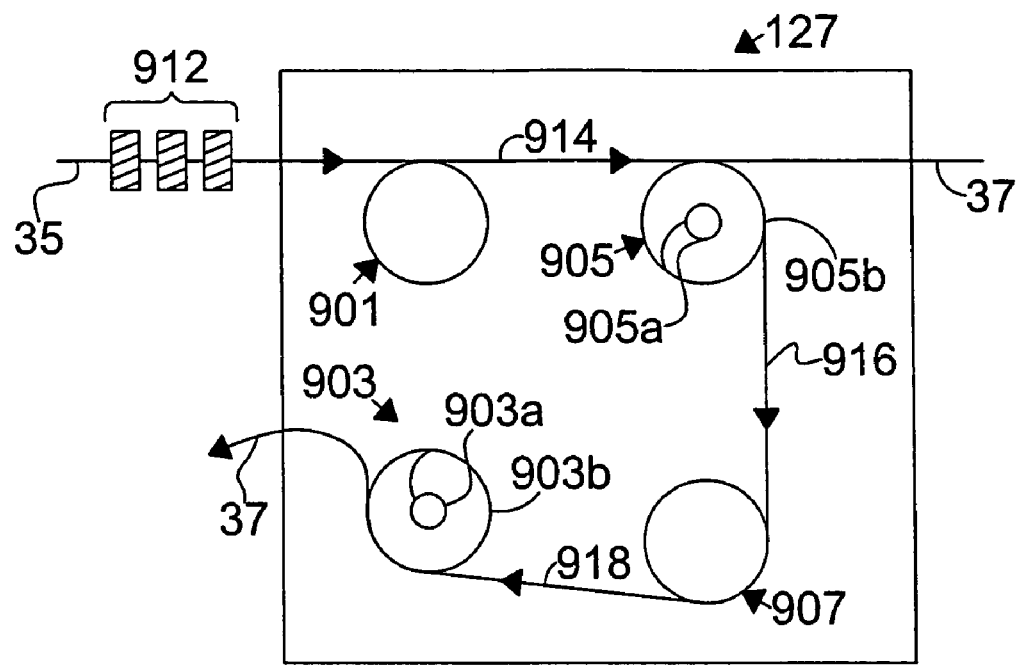
FIGS. 9A and 9B are, respectively, schematic top and side views of a multi-coil system, in accordance with an embodiment of the invention.
Figure 9B:
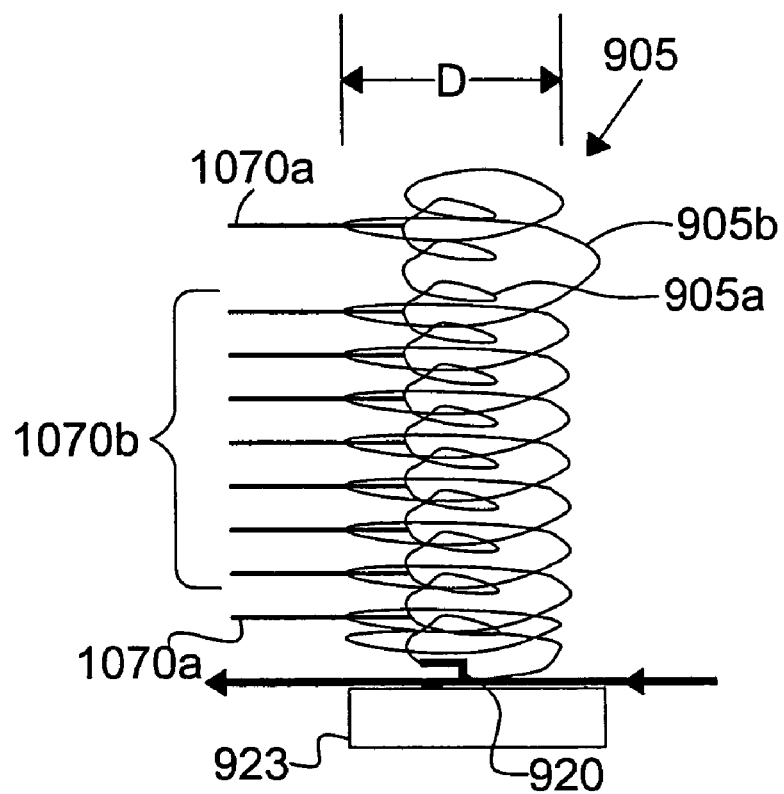
Figure 9C:
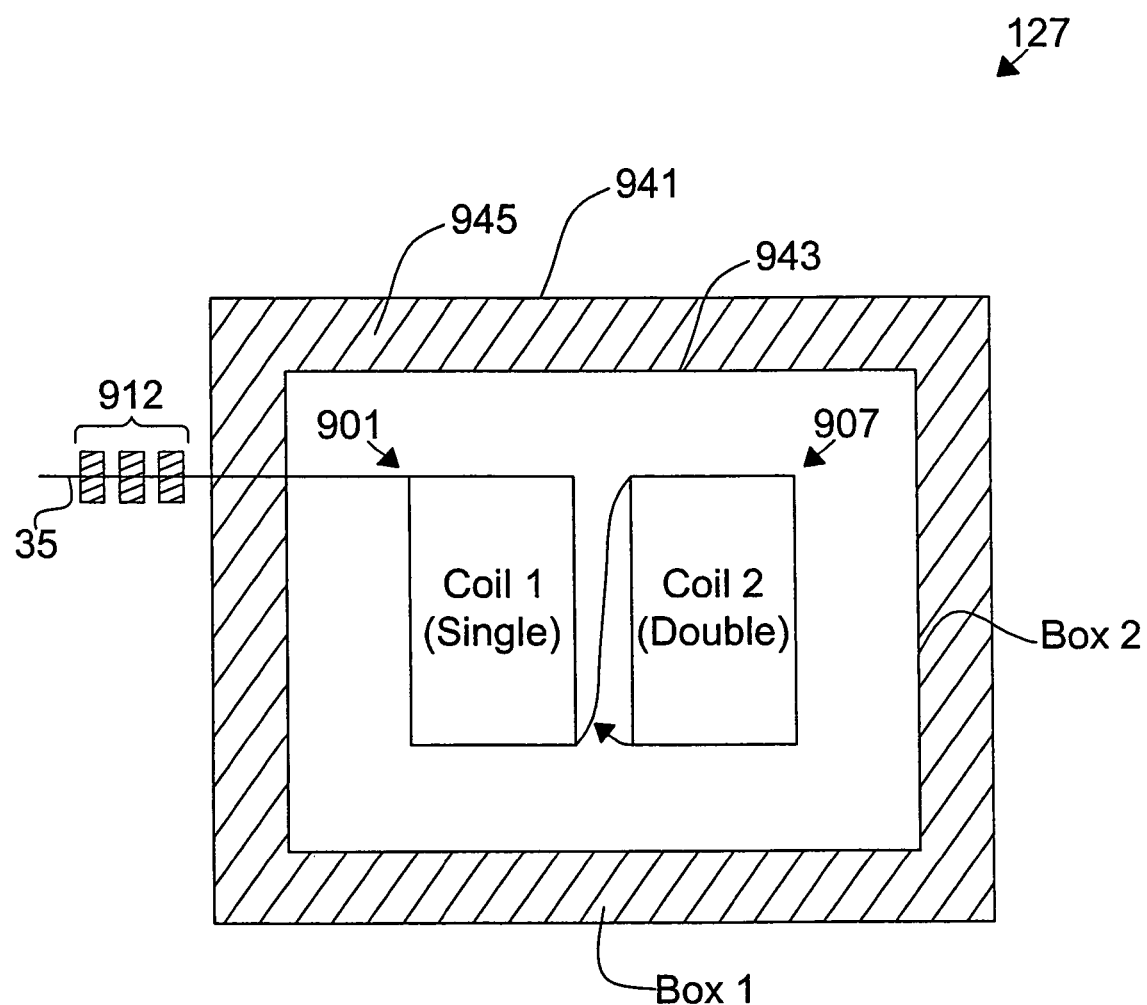
FIG. 9C is a schematic side view of the multi-coil system of FIG. 9A.

FIGS. 9A and 9C are, respectively, schematic top and side views of a multi-coil system, according to one embodiment of the present invention. Multi-coil system 127 preferably includes coil sets 901, 903, 905, and 907. Coil sets 901 and 907 are preferably single coils, while coil sets 903 and 905 preferably contain inner coils 903*a* and 905*a*, respectively, and outer coils 903*b* and 905*b*, respectively.

Super-oxygenated and structured water mixed with structured ozone is input via pipe 35 to multi-coil system 127. A series of magnets 912 may be optionally placed on pipe 35 prior to entry into multi-coil system 127. These magnets can be any shape, but are preferably donut magnets and preferably north field magnets surrounding or placed directly on the pipe 35.

As shown in FIG. 9A, coil set 901 is coupled to coil set 905 via a pipe 914, coil set 905 is coupled to coil set 907 via pipe 916, and coil set 907 is coupled to coil set 903 via pipe 918. In this embodiment, water preferably enters coil set or coil 901 at a top portion, spirals down to a bottom portion of coil 901 and then passes via pipe 914 to coil set 905. At coil set 905, water preferably enters a bottom portion of inner coil 905*a* and spirals up against gravity to a top portion of inner coil 905*a*. The water then passes into outer coil 905*b* and spirals down outer coil 905*b* to a bottom portion, where it exits coil set 905 via pipe 916. The water then preferably passes into a top portion of coil set or coil 907 and spirals downward to a bottom portion, where it exits coil 907 via pipe 918. The water next preferably enters coil set 903 at a bottom portion of inner coil 903*a*, spirals up (against gravity) to a top portion of inner coil 903*a*, where it passes into outer coil 903*b* before spiraling downward to a bottom portion of 903*b*, where it exits coil set 903 and multi-coil System 127 via pipe 37. The super-oxygenated, tuned and structured water is then directed to holding tank 109 via pipe 37.

As shown in FIG. 9C, multi-coil System 127 includes an outer box 941 and an inner box 943 with mica 945 contained in between inner box 943 and outer box 941. Coil sets 901–907 are preferably between ~5" and ~17" inches wide and preferably between ~14" and ~33 inches long, and more preferably ~7 inches wide and ~17 inches long. Inner coils 903*a* and 905*a* preferably have a diameter in the range of 2" to ~9", and more preferably between ~3" and ~5", and most preferably 3".

FIG. 9B is a schematic side view of coil set 905 of FIG. 9A. Coil set 905, includes outer coil 905*b* and inner coil 905*a*. As viewed from the top, the water spirals up the inner coil 905*a* in a clockwise fashion until it reaches a top portion and then spirals down the outer coil 905*b* where it exits the coil system 905. Inner coil 905*a* is preferably supported by one or more supports 1070A, preferably two dowel rods, and the outer coil 905*b* is preferably supported by one or more supports 1070B, preferably a plurality of dowel rods. The supports 1070A and 1070B are preferably connected to coils 905*a* and 905*b* using plastic ties.

Figure 9D:
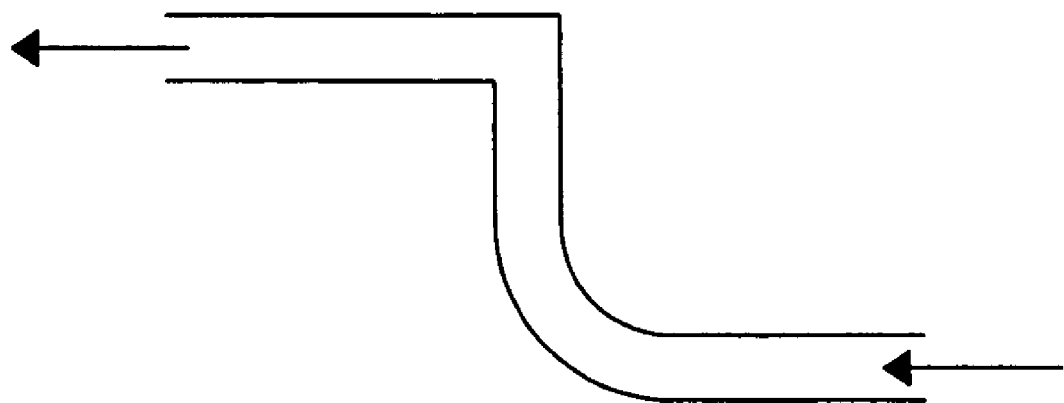
FIGS. 9D and 9E are schematic plan and side views of a pipe entry point into a coil set, according to an embodiment of the invention.
Figure 9E:
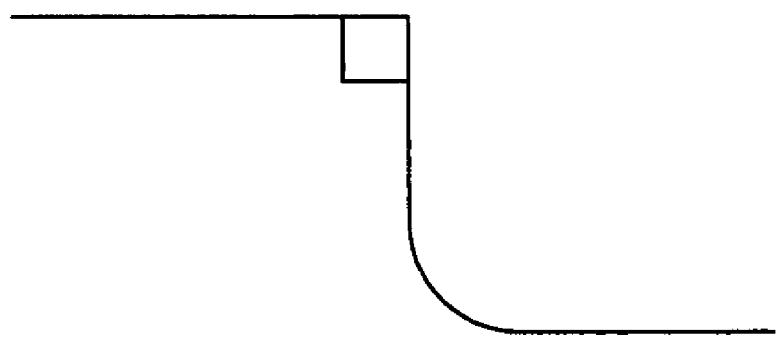

As shown in FIGS. 9D and 9E, the various pipes are connected to the various coils via a tube, preferably with a bend. In this embodiment, the tube is a glass tube with an ~90° bend. As can be seen in FIG. 9B, a crystal 923 may be placed at a base of the coil set 905. Crystal 923 is preferably a double terminated quartz crystal, but is not limited to clear quartz. The crystals are centered at the base and extend up inside the coil. Extending the crystal further up into the coil reduces the effects. Coil set 903 also has an arrangement like that shown in FIG. 9B with respect to the coil set 905. Each coil set 903, 905, and 907 also includes a crystal arranged as shown in FIG. 9B.

As shown in FIG. 9C, magnets 912 may be arranged on pipe 35 prior to entry into multi-coil system 127, and serve to cancel frequencies that have been input or are otherwise contained in the water prior to input to multi-coil system 127. Although multi-coil System 127 in this embodiment is shown with four coil sets, it can contain one, two, three or more than four coil sets, with various combinations of single and double coil sets. The inner diameter of the inner and outer coils for coil sets 901–907 is preferably ~5/16 inches. The coils for coil sets 901–907 are preferably made of crystal and not pyrex. Crystal 923, as well as the crystals for the other three coil sets, preferably have dimensions of ~17"×~18" to ~3"×~1", and more preferably ~8½ inches long and ~3½ inches across double terminated.

Figure 9F:
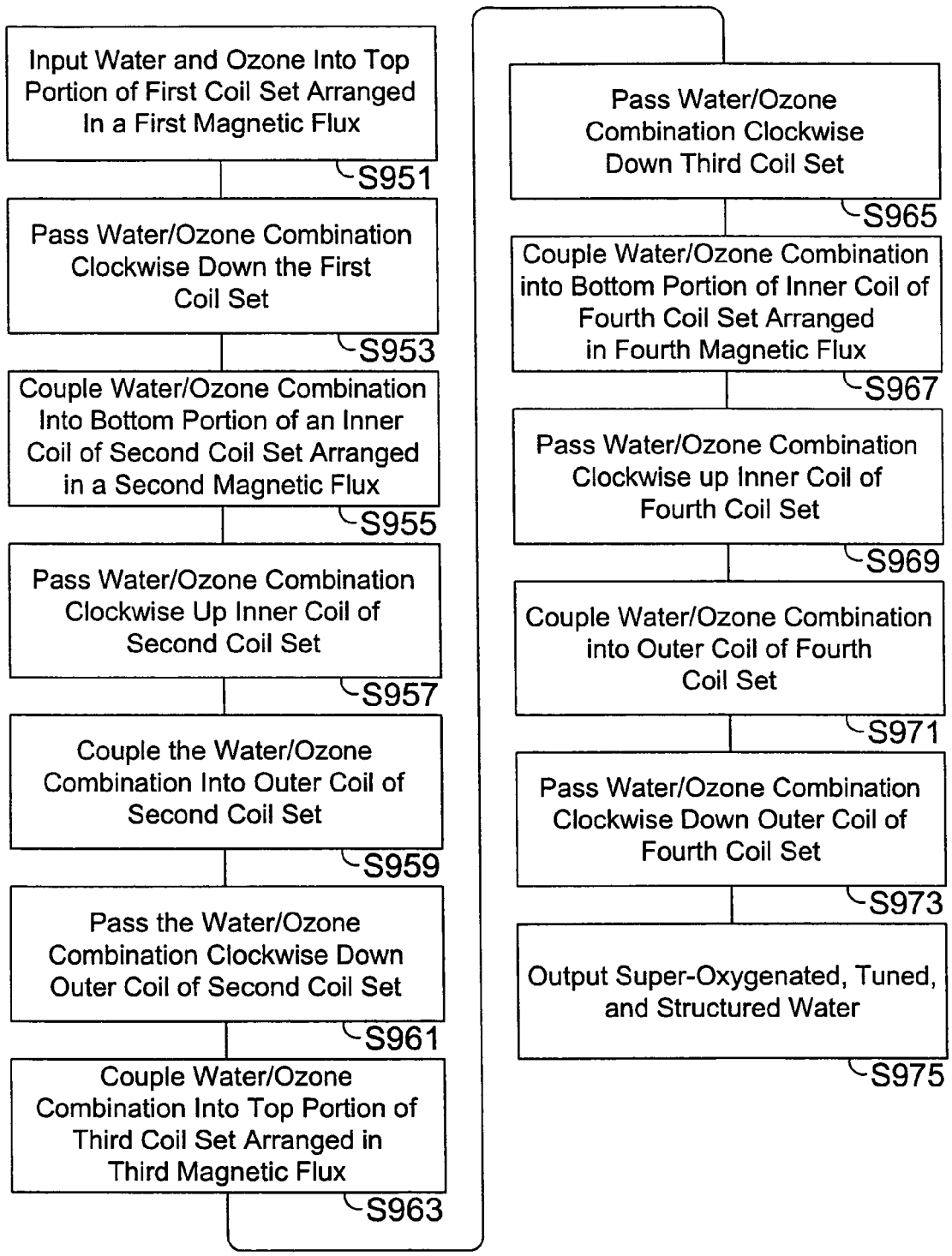
FIG. 9F is a flow chart of a method of using the multi-coil system of FIGS. 9A–9C.

FIG. 9F is a flow chart of a method performed by the multi-coil system of FIGS. 9A–9E. Step S951 involves inputting water and structured ozone into a top portion of a first coil set or coil arranged in a first magnetic flux. Step S953 involves passing the water/ozone combination clockwise down the first coil set. Step S955 involves coupling the water/ozone combination into the bottom of an inner coil of a second coil set arranged in a second magnetic flux. Step S957 involves passing the water/ozone combination clockwise up the inner coil of the second coil set. Step S959 involves coupling the water/ozone combination into the outer coil of the second coil set. Step S961 involves passing the water/ozone combination clockwise down the outer coil of the second coil set. Step S963 involves coupling the water/ozone combination into a top portion of a third coil set arranged in a third magnetic flux. Step S965 involves passing the water/ozone combination clockwise down the third coil set. Step S967 involves coupling the water/oxygen combination into a bottom portion of an inner coil of a fourth coil set arranged in a fourth magnetic flux. Step S969 involves passing the water/ozone combination clockwise up the inner coil of the fourth coil set. Step S971 involves coupling the water/ozone combination into the outer coil of the fourth coil set. Step S973 involves passing the water/ozone combination clockwise down the outer coil of the fourth coil set. Step S975 involves outputting super-oxygenated, tuned, and structured water.

Figure 10A:
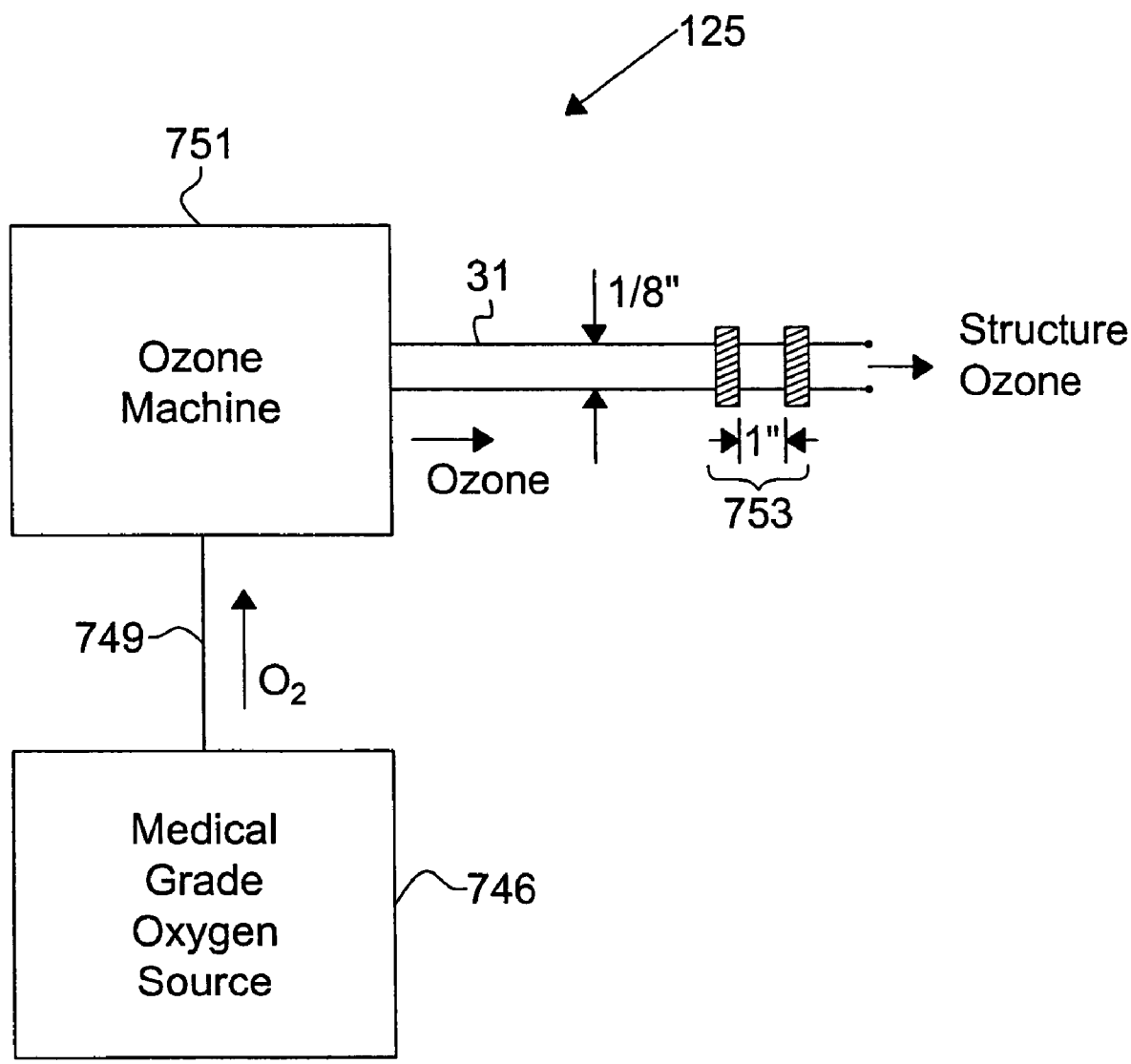
FIG. 10A is a block diagram of a structured ozone machine, in accordance with an embodiment of the invention.

FIG. 10A is a block diagram of a structured ozone machine, according to one embodiment of the present invention. Structured ozone machine 125 includes a medical grade oxygen source 746 coupled via a pipe 749 to a standard ozone machine 751. Medical grade oxygen is output from medical grade oxygen source 746 to ozone machine 751, which in turn produces ozone, which is output via pipe 31. Pipe 31 may be, for example, ~⅛ inch flex tubing. Two low Gauss magnets 753 are arranged on pipe 31. Although the two low Gauss magnets are shown in this embodiment, a single low Gauss or more than two, including three, four, five, and so forth, low Gauss magnets can be arranged along pipe 31. Where two low Gauss magnets are arranged on pipe 31, they are preferably spaced between ~½" and ~3 inches apart, and more preferably ~1 inch apart. In this case, the low Gauss magnets 753 are preferably magnets which are below ~1,000 Gauss, and more preferably below ~500 Gauss and most preferably ~200 Gauss each.

Figure 10B:
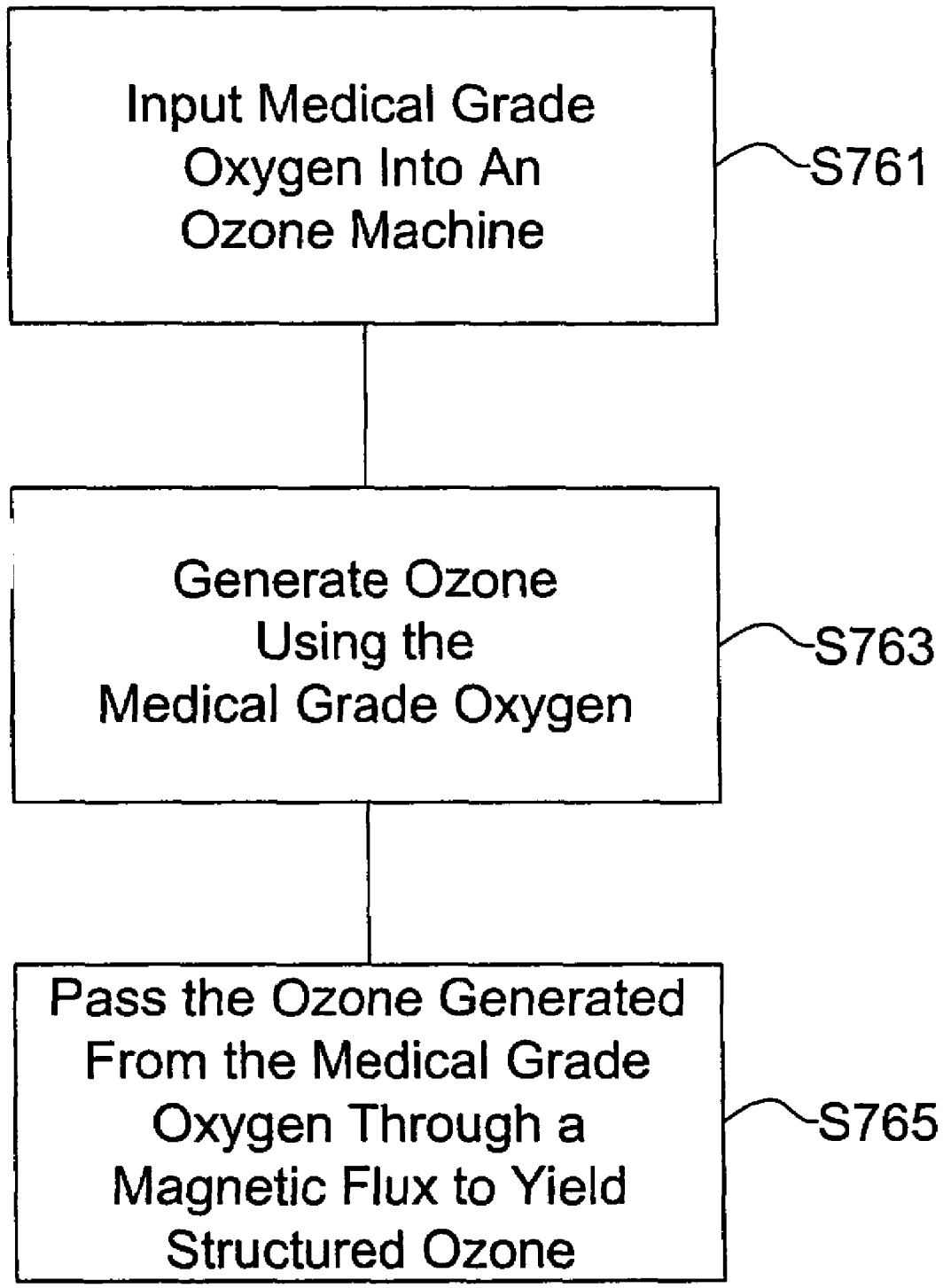
FIG. 10B is a flow chart of a method structuring ozone, in accordance with an embodiment of the invention.

FIG. 10B is a flow chart of a method performed by the structured ozone machine of FIG. 10A to produce structured ozone. Step S761 involves inputting medical grade oxygen into structured ozone machine 125. Step S763 involves generating ozone using the medical grade oxygen. Step S765 involves passing the ozone generated from the medical grade oxygen through a magnetic flux to yield structured ozone.

The water flow throughout the system is preferably controlled to enhance the system's performance. That is, pipe diameters and pressures at each point P in the system are preferably configured to ensure proper functioning. Referring to FIG. 1A, pipe diameters and water pressure at each point P are preferably as follows.

At Point P1: Pipe diameter is preferably ½ to ~3 inch(es), more preferably ~1 to ~1¼ inch(es), most preferably ~1¼ inches. Pressure is preferably ~17 to ~36 psi, more preferably ~18 to ~30 psi, most preferably ~27 psi.

At Point P2: Pipe diameter is preferably ~⅜ to ~1½ inch(es), more preferably ~¾ to ~1¼ inch(es), most preferably ~1 inch. Pressure is preferably ~17 to ~36 psi, more preferably ~18 to ~26 psi, most preferably ~22 psi.

At Point P3: Pipe diameter is preferably ~⅜ to ~1½ inch(es), more preferably ~¾ to ~1¼ inches(es), most preferably ~1 inch. Pressure is preferably ~12 to ~20 psi, more preferably ~12 to ~15 psi, most preferably ~15 psi.

At Point P4: Pipe diameter is preferably ~⅜ to ~1¼ inch(es), more preferably ~½ to ~1 inch(es), most preferably ~1 inch. Pressure is preferably ~12 to ~20 psi, more preferably ~12 to ~15 psi, most preferably ~15 psi.

At Point P5: Pipe diameter is preferably ~¾ to ~1½ inch(es), more preferably ~¾ to ~1 inch(es), most preferably ~1 inch. Pressure is preferably ~40 to ~80 psi, more preferably ~40 to ~60 psi, most preferably ~69 psi.

At Point P6: Pipe diameter is preferably ~¼ to ~¾ inch(es), more preferably ~¼ to ~⅜ inch(es), most preferably ~⅜ inch. Flow rate should be preferably 5 liters per minute. (Pressure preferably ~22 to ~60 psi, more preferably ~30 to ~45 psi, most preferably ~44 psi.)

At Point P7: Pipe diameter is preferably ~¼ to ~1¼ inch(es), more preferably ~½ to ~¾ inch(es), most preferably ~½ inch. Pressure is preferably ~50 to ~75 psi, more preferably ~49 to ~69 psi, most preferably ~69 psi.

At Point P8: Pipe diameter is preferably ~¼ to ~¾ inch(es), more preferably ~½ to ~⅝ inch(es), most preferably ~½ inch. Pressure is preferably ~5 to ~25 psi, more preferably ~5 to ~10 psi, most preferably ~7–10 psi.

At Point P9: Pipe diameter is preferably ~½ to ~1 inch(es), more preferably ⅝ to ~¾ inch(es), most preferably ~¾ inch. Pressure is preferably 18 to ~35 psi, more preferably ~18 to ~25 psi, most preferably ~25 psi.

At Point P10: Pipe diameter is preferably ~¼ to ~¾ inch(es), more preferably ~¼ to ~½ inch(es), most preferably ~½ inch. Pressure is preferably ~18 to ~35 psi, more preferably ~30 to ~42 psi, most preferably ~40–42 psi.

At Point P11: Pipe diameter is preferably ~¼ to ~¾ inch(es), more preferably ~⅜ to ~½ inch(es), most preferably ~½ inch. Pressure is preferably ~15 to ~50 psi, more preferably ~20 to ~40 psi, most preferably ~34 psi.

At Point P12: Pipe diameter is preferably ~1/16 to ~¼ inch(es), more preferably ~1/16 to ~⅛ inch(es), most preferably ~⅛ inch. Flow rate is preferably ⅛ liter per minute.

At Point P13: Pipe diameter is preferably ~1/16 to ~¾ inch(es), more preferably ~⅜ to ~½ inch(es), most preferably ~½ inch. Pressure is preferably ~10 to ~25 psi, more preferably ~10 to ~18 psi, most preferably ~15–18 psi.

At Point P14: Pipe diameter is preferably ~1/16 to ~¾ inch(es), more preferably ~⅜ to ~½ inch(es), most preferably ~½ inch. Pressure is preferably ~15 to ~35 psi, more preferably ~18 to ~22 psi, most preferably ~22 psi.

At Point P15: Pipe diameter is preferably ~1/16 to ~¾ inch(es), more preferably ~⅜ to ~½ inch(es), most preferably ~½ inch. Pressure is preferably ~15 to ~75 psi, more preferably ~22 to ~60 psi, most preferably ~30–40 psi.

EXAMPLE 1

Heart Rate and Excercise Performance

The present example is provided to demonstrate the utility of the present invention for maintaining and/or restoring a desired physiological fluid oxygen level in an animal. In particular aspects, the present example will also demonstrate the utility of the present compositions for maintaining, and in some aspects normalizing, a reduced oxygenated blood level in an animal subsequent to a blood oxygen-lowering effect activity, such as what typically occurs in an animal, such as a human, after an oxygen-consuming activity, such as exercise. Changes in these physiologically measurable parameters are typically attendant an increase in physical activity, stress or other fatigue-inducing event.

The parameters that were measured in the present study were changes in subjects consuming the oxygen-enriched, microstructured water preparations verses subjects consuming conventional bottled water. The changes in these two subject populations were monitored for changes in heart rate, changes in oxygen saturation, changes in blood lactate, changes in oxygen consumption, and changes in fatigue assessment by a patient in response to a defined exercise regimen after having consumed a defined quantity of the oxygen-enriched, structured and/or microstructured water, or after consuming a conventional bottled water.

The present study was a randomized, double blind crossover study. Subjects were recruited from training facilities in Montreal. Subjects were tested on four different days during a two-week period. The subjects comprised a group of males and females of at least 18 years in age in good physical condition. None of the test subjects had any history of serious chronic disease. Each of the test subjects had been in physical training during the previous year, training at least 2 times per week, during the time preceding their participation in the present study.

The test subjects were randomly assigned to a group to receive the oxygen enriched, structured and microstructured water preparation verses a preparation of conventional tap or bottled water (Placebo).

The total duration of the study was 14 days, comprised of four (4) evaluation visits. Each subject, depending on the group assigned, was asked to drink 500 ml of the oxygen-enriched structured and microstructured water or 500 ml of the bottled Santa Fe municipal city water. Each subject was then asked to sit for 5 minutes. After 5 minutes, a baseline physiological set of measurements were recorded for each subject. These measurements included heart rate, blood pressure, blood oxygen, blood oxygen saturation, and blood lactate.

Once recorded, the subject began a 5-minute warm-up on a treadmill. After this warm-up period, the subject began a multi-stage $VO_2$-max test. Each subject then underwent a standardized five-step exercise tolerance test to fatigue. During this test, each subject was asked to consume 500 ml of the oxygen-rich, microstructured water or bottled spring water, according to the initial test group to which they were originally assigned. (Total consumption by each test subject was between ½ and ¾ liter).

The multi-stage $VO_2$— max test commenced at a speed of 11.3 km/hr (7.02 miles/hr) and a slope of 2 degrees. The slope was then progressively increased by 2 degrees every minute. At the end of each stage, heart rate, blood pressure and blood oxygen saturation were measured. Upon maximal exertion, $VO_2$ max was calculated and blood lactate was measured. A visual analog scale was used to assess perceived fatigue (i.e., maximal exertion), at the end of the VO2 max. For this determination, the subject was asked to place an "X" on a 10 cm line indicating how tired they felt at the end of the VO$_2$ max test with one end of the line indication no fatigue (0), and the other end indication exhaustion (10). This routine was repeated with the same product 2 days later. A third visit took place one week later when subjects were asked to return to the gym.

Each subject then completed the same protocol of exercise a second time, this time consuming the opposite product (i.e., Group 1—Bottled Santa Fe Municipal City Water Placebo) consumed (½ to ¾ liter) during Exercise Test Session 1; Group 1—Oxygen-enriched, Structured and Microstructured water (AGFW) consumed (½ to ¾ liter) during Exercise Test Session 2) (Group 2—Bottled Spring Water (Placebo) consumed (1 Liter) during Exercise Test Session 1 (1 Liter); Group 2—Oxygen-enriched, Microstructured Water (AGFW) during Exercise Test Session2).

As demonstrated in the data presented at Tables 1, 2 and 3, the performance parameters that were assessed and compared in response to consumption of the oxygen-enriched, microstructured water preparations were heart rate, oxygen saturation, blood lactate, and oxygen consumption and fatigue assessment. As used in this study and others described throughout this application, "fatigue" is defined as the length of physical exertion needed for the subject to assess subjectively an exhaustion level of at least 7 on a scale of 0 to 10.

Table 1 presents the data collected from the subjects at a first visit and at a second visit. Table 2 presents the change demonstrated in each of the performance parameters. Table 3 presents an analysis of the differences between the changes observed in each of the performance parameters examined.

TABLE 1

Exercise Performance Parameters by Visit and Treatment Period

| Parameter: | | Visit 1 | | | Visit 2 | | P-Value |
|---|---|---|---|---|---|---|---|
| | | AGFW | Placebo | P-Value | AGFW | Placebo | |
| Change in Heart Rate | Mean (SD) | 86.93 (18.15) | 76.00 (15.60) | 0.001 | 76.25 (14.70) | 75.76 (13.64) | 0.999 |
| | 95% C.I. | 81.38, 92.49 | 71.22, 80.78 | | 71.76, 80.75 | 71.60, 79.96 | |
| Change in Oxygen Saturation (%) | Mean (SD) | −2.05 (2.53) | −1.90 (2.32) | 0.377 | −2.22 (1.67) | −1.85 (2.37) | 0.198 |
| | 95% C.I. | −2.82, −1.27 | −2.61, −1.19 | | −2.73, −1.71 | −2.58, −1.13 | |
| Blood Lactate | Mean (SD) | 11.30 (3.64) | 9.43 (3.52) | 0.007 | 10.29 (3.09) | 9.44 (4.05) | 0.125 |
| | 95% C.I. | 10.19, 12.41 | 8.35, 10.50 | | 9.34, 11.23 | 8.20, 10.68 | |
| Calculated Oxygen Consumption | Mean (SD) | 66.37 (4.23) | 66.05 (4.47) | 0.407 | 66.39 (4.50) | 66.59 (4.92) | 0.750 |
| | 95% C.I. | 65.07, 67.66 | 64.68, 67.42 | | 65.01, 67.77 | 65.08, 68.09 | |
| Fatigue Assessment | Mean (SD) | 11.94 (2.36) | 11.94 (1.89) | 0.539 | 11.94 (2.25) | 11.82 (2.17) | 0.744 |
| | 95% C.I. | 11.18, 12.66 | 11.36, 12.52 | | 11.25, 12.63 | 11.16, 12.49 | |

TABLE 2

Change in Exercise Performance Parameters between Visits by Treatment Period

| Parameter: | | AGFW | | Placebo | | P-Value Between Treatment |
|---|---|---|---|---|---|---|
| | | Estimate | P-Value Within Treatment | Estimate | P-Value Within Treatment | |
| Change in Heart Rate | Mean (SD) | −10.68 (16.11) | 0.932 | −0.22 (13.17) | 0.081 | 0.002 |
| | 95% C.I. | −15.61, −5.75 | | −4.25, 3.81 | | |
| Change in Oxygen Saturation (%) | Mean (SD) | −0.17 (2.13) | 0.067 | 0.05 (2.72) | 0.070 | 0.519 |
| | 95% C.I. | −0.83, 0.48 | | −0.78, 0.88 | | |
| Blood Lactate | Mean (SD) | −1.01 (4.08) | 0.604 | 0.01 (3.89) | 0.814 | 0.241 |
| | 95% C.I. | −2.26, 0.23 | | −1.18, 1.20 | | |
| Calculated Oxygen Consumption | Mean (SD) | 0.02 (2.41) | 0.040 | 0.54 (2.51) | 0.001 | 0.267 |
| | 95% C.I. | −0.71, 0.76 | | −0.23, 1.31 | | |
| Fatigue Assessment | Mean (SD) | 0.00 (2.80) | 0.342 | −0.12 (2.19) | 0.852 | 0.632 |
| | 95% C.I. | −0.85, 0.86 | | −0.79, 0.55 | | |

TABLE 3

Difference in Change in Exercise Performance Parameters between Treatment Periods

| Parameter: | | Absolute | | Percent | |
| --- | --- | --- | --- | --- | --- |
| | | Estimate | P-Value Between Treatment | Estimate | P-Value Between Treatment |
| Change in Heart Rate | Mean (SD) 95% C.I. | 10.46, 19.43 4.51, 16.41 | 0.002 | −0.65 (4.95) −2.18, 0.89 | 0.038 |
| Change in Oxygenation (%) | Mean (SD) 95% C.I. | 0.22 (3.65) −0.89, 1.34 | 0.519 | −1.43 (1.74) −2.04, −0.82 | 0.041 |
| Blood Lactate | Mean (SD) 95% C.I. | 1.03 (4.75) −0.43, 2.48 | 0.241 | 0.26 (8.17) −2.24, 2.76 | 0.001 |
| Calculated Oxygenation | Mean (SD) 95% C.I. | 0.51 (3.31) −0.50, 1.53 | 0.267 | −0.49 (1.84) −1.23, 0.25 | 0.002 |
| Fatigue Assessment | Mean (SD) 95% C.I. | −0.12 (3.29) −1.13, 0.89 | 0.632 | −0.59 (4.79) −2.08, 0.90 | 0.050 |

Results:

The following efficacy outcome measures were defined to assess the effect of consuming the oxygen-enriched water preparations on exercise performance in the subject participants.

For each parameter, the measurement at each visit was determined as Pl1 (Placebo, first visit), Pl2 (Placebo, visit 2), AGFW1 (Oxygen-enriched water, visit 1), and AGFW2 (oxygen-enriched water, visit 2).

For each subject, the following variables were calculated:
CHANGE BETWEEN VISIT 2 AMD VISIT 1 FOR PLACEBO:
  $DPl_{2-1}: Pl_2 - Pl_1$
CHANGE BETWEEN VISIT 2 AND VISIT 1 FOR OXYGEN-ENRICHED
  PRODUCT (AGFW):
  $DAGFW_{2-1}: AGFW_2 - AGFW_1$
CHANGE BETWEEN AGFW AND PLACEBO:
  $DAGFW_{2-1} - DP_{2-1}$
PERCENT CHANGE BETWEEN AGFW AND PLACEBO:
  $100\% \times (DAGFW_{2-1} - DPl_{2-1})/DPl_{2-1}$ The primary outcome variable for the studies was the latter variable that measures the percent difference in the effect between the oxygen-enriched water and the placebo.

Statistical Methods:

Given that each subject used both the placebo and the oxygen-enriched preparations, and the fact that the distribution of the study outcomes deviated from normal due to the small sample size, the Kolmogorov-Smirnov paired, non-parametric tests were used to assess the statistical significance of the different water regimens. The null hypothesis tested was the mean change between the oxygen-enriched preparations (AGFW) and the placebo was zero. Two tailed significance testing was used. When the distribution of the variable deviated from the normal, the non-parametric was used.

Change in Heart Rate:

At visit one, a significant difference was observed in the heart rate of patients consuming the oxygen-enriched, structured and microstructured water, compared to subjects who consumed conventional tap water. At visit 1, a significant difference was observed in heart rate.

Heart rate (HR) is proportional to the work rate in physical activities with anaerobic energy supply. The relationship between HR and workload is highly reproducible for any individual (1). The simple way of registering HR has made it the most widely used estimate of metabolic strain in training or competition for many types of exercise (2–4). The measurement of heart rate in this study was based on the change in pulse between the beginning and the end of the exercise test defined as 80% maximum capacity. The reduction of change in heart rate during exercise until fatigue indicates that subjects who consumed the oxygen-enriched water increased their endurance by significantly reducing the increase of pulse by 65%.

The mean (SD) percent change was 0.65 (4.95), indicating that when subjects consumed the oxygen-enriched water, the change in heart rate during exercise to fatigue was reduced by 65% when compared to placebo.

EXAMPLE 2

Change in Oxygen Saturation

The present example demonstrates the utility of the present compositions and methods for inhibiting and/or onset of fatigue in a human. The maintenance of oxygen saturation levels (i.e., decreasing the change in oxygen saturation levels attendant exercise) in response to exercise is also demonstrated.

Oxygen saturation measurements were taken during the exercise periods. The change in oxygen saturation between beginning of the exercise and the end was used for the determination of effect on oxygen saturation.

When subjects consumed the oxygen-enriched water product, the change in blood oxygen saturation after a period of exercise was significantly less than the dramatic drop in blood oxygen saturation demonstrated after exercise in subjects that consumed the bottled Santa Fe municipal city water (placebo).

The results show that when the subjects used the oxygen-enriched preparations, the drop in oxygen saturation was less by a factor of 1.5 (150%), in comparison to the drop in oxygen saturation demonstrated in subjects consuming the Santa Fe Municipal City bottled water preparations (placebo). This effect is statistically significant (P=0.041).

EXAMPLE 3

Blood Lactate

The present example demonstrates the utility of the present compositions and methods for inhibiting and/or reducing the increase in levels of blood lactate attendant exercise in a human. In addition, and because blood lactate level may be directly correlated with lactic acid accumulation in muscle attendant exercise, the present example also demonstrates the utility of the presently described methods and compositions for reducing muscle soreness, and for reducing lactic acid accumulation in muscle as indicated by blood lactate levels. The present study demonstrates that consumption of the defined oxygen enriched preparation significantly inhibited (i.e., reduced) the typical increase in blood lactate levels saturation typically attendant exercise.

Patients were treated and monitored as outlined in Example 1. Blood lactate levels were obtained from all subjects. The data from these studies is presented in Tables 1, 2 and 3.

Blood Lactate:

Blood lactate levels were at least 89.95% lower in subjects consuming the oxygen-enriched water preparations, compared to blood lactate levels in subjects consuming the bottled water preparation (Placebo), after the defined exercise regimen. This difference is statistically significant ($P=0.010$).

Lactic Acid:

Lactate in the blood can be correlated with the accumulation level of lactic acid in muscle tissue; the present data also provides indication that the consumption of the oxygen-enriched water preparations as defined herein can significantly reduce lactic acid accumulation in tissues. It is thus further expected that the use of the oxygen-enriched water preparations as herein defined can significantly reduce the muscle soreness/burning typically attendant periods after extreme exercise.

EXAMPLE 4

Calculated Oxygen Consumption

The present example is presented to demonstrate the utility of the present methods for reducing and/or inhibiting the significant and sudden increase on oxygen consumption attendant exercise n a human.

Subjects were treated according to the regimen outlined in Example 1. The oxygen consumption data collected from the subjects that consumed the oxygen-enriched microconstructed water (AGFW) or the bottled spring water (Placebo) is presented at Tables 1, 2 and 3.

The study demonstrated that consumption of the defined oxygen enriched preparation significantly inhibited (i.e., reduced) the characteristic increase in oxygen consumption levels saturation typically attendant exercise.

Over a period of three days of consumption the oxygen-enriched water preparations, a much more static, conservative and constant amount of oxygen consumption was achieved by the body. This is contrasted by the significant increase in oxygen consumption illustrated by the significant increase in oxygen consumption. Oxygen consumption was reduced by 50%. This change was also statistically significant ($P=0.004$).

EXAMPLE 5

Enhanced Endurance/Fatigue Onset Assesment

The present example is presented to demonstrate the utility of the present methods and compositions for reducing and/or inhibiting the onset of fatigue in response to exercise in a human.

Subjects were treated according t the regimen outlined in Example 1. The fatigue assessment data from the subjects that consumed the oxygen-enriched microstructured water (AGFW) or the bottled Santa Fe Municipal City water (Placebo) is presented at Tables 1, 2 and 3.

The mean standard deviation (SD) percent change was 0.65 (4.95), indicating that when subjects consumed the oxygen enriched preparations, the change in heart rate during exercise to fatigue was reduced by 65% when compared to placebo.

A statistically significant difference with respect to subjective assessment of fatigue by a factor of 59% in subjects consuming the oxygen-enriched preparations. ($P=0.04$).

EXAMPLE 6

Increase in Blood Oxygen

The present example is presented to demonstrate the utility of the present methods and compositions for increasing and/or replenishing available oxygen in the blood stream by consuming the oxygen-enriched microstructured water preparations.

The present studies were conducted on humans using a medical oximeter. In these studies, it was demonstrated that consumption of the oxygen-enriched, microstructered component containing water compositions of the present invention greatly increased the availability of oxygen in the bloodstream. Using the oximeter, it is shown that a person's blood oxygen levels taken at high altitude (over 5,000 feet) can be increased within two minutes of consuming the enriched oxygen, microstructured water. The overall increase in oxygen in the blood at high altitudes usually increases from three (3) to six (6) points after drinking either ounces of the oxygen enriched, microstructured water. A medical grade oximeter provides an accurate analysis of blood oxygen levels that is not invasive to the patient and that is immediately detectable. The accuracy of the device is +/−2%. The device is slipped over the top of, for example, a finger, and allowed to moniter and take a reading of the patient/subject both before and after consuming the appropriate amount of the oxygen enriched, microstructured water.

The medical grade oximeter used in the present example demonstrated a measurable increase in the blood hemoglobin levels of the patient. These results demonstrate the utility of using the presently disclosed methods and compositions for the treatment of a variety of conditions associated and/or linked with low blood oxygen, such as altitude sickness. In addition, it is anticipated that the present compositions are also useful as a preferred beverage for consumption by professional athletes and/or those persons involved in any competitive sport, and provide for an enhancement of the persons endurance and performance as a result of the increase in available blood oxygen.

EXAMPLE 7

Bound Oxygen Stability in Open (Non-Pressurerized) Conditions

The present example demonstrates that the oxygen-enriched preparations herein are capable of retaining a higher concentration and/or amount of oxygen under open-air (i.e., open container) conditions. Absent the microstructured nature of the present preparations, the oxygen concentration would decrease and leak/evaporate away.

A WTW 300 DO meter was used to test and determine oxygen content and stability in the oxygenated alkaline structured water (this water was 6 months old). The oxygen content was tested at 76 ppm and tested every hour on the hour for three days. The water was placed in a 4 inch open beaker in a warehouse that had no air conditioning. Temperatures ranged from 74° F. at night to 101° F. during the day. Even after agitating the water in the four inch wide beaker every hour after three days, the first hour of the fourth day there was approximately 30 ppm of oxygen in the water. When the water was subsequently boiled, frozen and shaken, the water still was just as effective biologically even though the oxygen was reduced to 30% of its original levels using a DO meter.

The foregoing embodiments and advantages are merely exemplary and are not to be construed as limiting the invention. The present teaching can be readily applied to other types of apparatuses. The description of the invention is intended to be illustrative, and not to limit the scope of the claims. Many alternatives, modifications, and variations will be apparent to those skilled in the art. In the claims, means-plus-function clauses are intended to cover the structures described herein as performing the recited function and not only structural equivalents but also equivalent structures.

What is claimed is:

1. A cone system for use with a system for producing and tuning super-oxygenated and structured water, the system comprising:
   a source of oxygen; and
   a plurality of cones in communication with the source of oxygen and configured to receive preconditioned water and spin the preconditioned water to combine it with oxygen received from the source, wherein the plurality of cones each comprise,
   an input tube,
   a bent tube in communication with the input tube, and
   a cone-shaped outer shell, wherein the bent tube comprises crystal.

2. The cone system of claim 1, wherein the source of oxygen comprises a source of medical grade oxygen.

3. The cone system of claim 1, wherein the plurality of cones are arranged at least partially in series.

4. The cone system of claim 1, wherein the plurality of cones comprises six cones.

5. The cone system of claim 4, wherein the plurality of cones comprise two sets of three cones oriented in series.

6. The cone system of claim 1, wherein each of the plurality of cones are configured to individually spin a combined preconditioned water and oxigen stream.

7. The cone system of claim 1, wherein the preconditioned water is received by an input pipe.

8. The cone system of claim 7, wherein the input pipe is in communication with the source of oxygen by means of a valve.

9. The cone system of claim 1, wherein the bent tube comprises at least two bends.

10. The cone system of claim 9, wherein the bent tube comprises at least two ~90° bends.

11. The cone system of claim 1, wherein the bent tube creates a clockwise spin within the cone-shaped shell, creating a right-handed vortex spin.

12. The cone system of claim 1, wherein the preconditioned water and oxygen are input to the bent tube under high pressure.

13. A cone structure for a cone system, the cone structure comprising:
   an input tube;
   a bent tube in communication with the input tube; and
   a cone-shaped outer shell, wherein the bent tube comprise crystal.

14. The cone structure of claim 13, wherein the bent tube comprises at least two bends.

15. The cone structure of claim 14, wherein a first portion of the bent tube prior to the first bend has an inner diameter of less than ¼" and an outer diameter of less than ½"; wherein a second portion of the bent tube after the first bend and prior to the second bend has an inner diameter of less than ⅛" and an outer diameter of less than ¼", wherein the second portion of the bent tube extends less than 1¾" to a position less than ⅜" from an inner surface of the outer shell, and wherein an upper edge of the outer shell has a diameter of less than 6" and a lower edge of the outer shell has a diameter of less than ⅛".

16. The cone structure of claim 15, wherein the second portion of the bent tube is attached to the outer shell by a solder joint.

17. The cone structure of claim 14, wherein the bent tube comprises at least two approximately 90° bends, wherein the bent tube creates a clockwise spin within the cone-shaped shell, creating a right-handed vortex spin, and wherein the preconditioned water and oxygen are input to the bent tube under high pressure.

18. A cone structure for a cone system, the cone structure comprising:
   an input tube;
   a bent tube in communication with the input tube; and
   a cone-shaped outer shell, wherein a first portion of the bent tube prior to a first bend has an inner diameter of less than ¼" and an outer diameter of less than ½"; wherein a second portion of the bent tube after the first bend and prior to a second bend has an inner diameter of less than ⅛" and an outer diameter of less than ¼", wherein the second portion of the bent tube extends less than 1¾" to a position less than ⅜" from an inner surface of the outer shell, and wherein an upper edge of the outer shell has a diameter of less than 6" and a lower edge of the outer shell has a diameter of less than ⅛".

* * * * *